(12) United States Patent
Wong et al.

(10) Patent No.: US 10,380,708 B1
(45) Date of Patent: Aug. 13, 2019

(54) NATURAL LANGUAGE BASED CONTENT ANALYSIS

(71) Applicant: AMAZON TECHNOLOGIES, INC., Reno, NV (US)

(72) Inventors: Oliver Nam Wong, Seattle, WA (US); Divya Mahalingam, Seattle, WA (US); William Tunstall-Pedoe, Cambridge (GB); Jennifer Amy Sadler, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 1024 days.

(21) Appl. No.: 14/482,856

(22) Filed: Sep. 10, 2014

(51) Int. Cl.
*G06F 16/00* (2019.01)
*G06Q 50/18* (2012.01)
*G06F 16/36* (2019.01)

(52) U.S. Cl.
CPC ......... *G06Q 50/184* (2013.01); *G06F 16/367* (2019.01)

(58) Field of Classification Search
CPC ......... G06F 17/30017; G06F 17/30265; G06F 17/30029; G06F 17/30047; G06F 17/30705; G06F 16/367; G06Q 50/184
USPC ....................................................... 707/723
See application file for complete search history.

(56) References Cited

U.S. PATENT DOCUMENTS

| | | | |
|---|---|---|---|
| 7,013,308 B1 | 3/2006 | Tunstall-Pedoe | |
| 7,120,642 B2* | 10/2006 | Hsu | G06F 17/2705 |
| 9,305,083 B2* | 4/2016 | Hu | G06F 17/30864 |
| 9,639,518 B1* | 5/2017 | Goodspeed | G06F 17/27 |
| 9,684,641 B1* | 6/2017 | Hamaker | G06F 17/2288 |
| 2005/0240546 A1* | 10/2005 | Barry | G06N 5/046 |
| | | | 706/47 |
| 2007/0043708 A1 | 2/2007 | Tunstall-Pedoe | |
| 2011/0307435 A1 | 12/2011 | Overell et al. | |
| 2012/0078612 A1* | 3/2012 | Kandekar | G06F 17/2745 |
| | | | 704/9 |

* cited by examiner

*Primary Examiner* — Monica M Pyo
(74) *Attorney, Agent, or Firm* — Lindauer Law, PLLC

(57) ABSTRACT

Techniques are described for determining whether a submitted work, such as a manuscript submitted for publication as an electronic book, is consistent with other published works associated with a fictional world, universe, or other framework. A set of constraints may be determined based on a semantic analysis of the published works of a framework, the constraint(s) describing attributes of noun objects or relationships between noun objects in the published work(s). Statements may be determined by applying the semantic analysis to the submitted work. Inconsistencies between the statements and the constraints may be identified and communicated to reviewers, for use in determining whether to publish the work. Comparison of the statements to the constraints may be made through reference to other statements included in a knowledge base of information regarding the framework.

20 Claims, 11 Drawing Sheets

NATURAL LANGUAGE BASED CONTENT ANALYSIS

BACKGROUND

Given the growing popularity of mobile computing devices configured to present electronic books or other digital content, device providers or content providers may seek new sources of content presentable on mobile computing devices. To satisfy customer demand for content, content providers have created direct publishing or self-publishing models that enable authors or publishers to submit content such as an electronic book for publication. The submitted content may be made available for purchase by customers and available for download to a mobile computing device. The submitted content may be reviewed to determine whether it is suitable for publication. In some cases, the review of submitted content may consume a substantial amount of time and resources.

Figure 1:
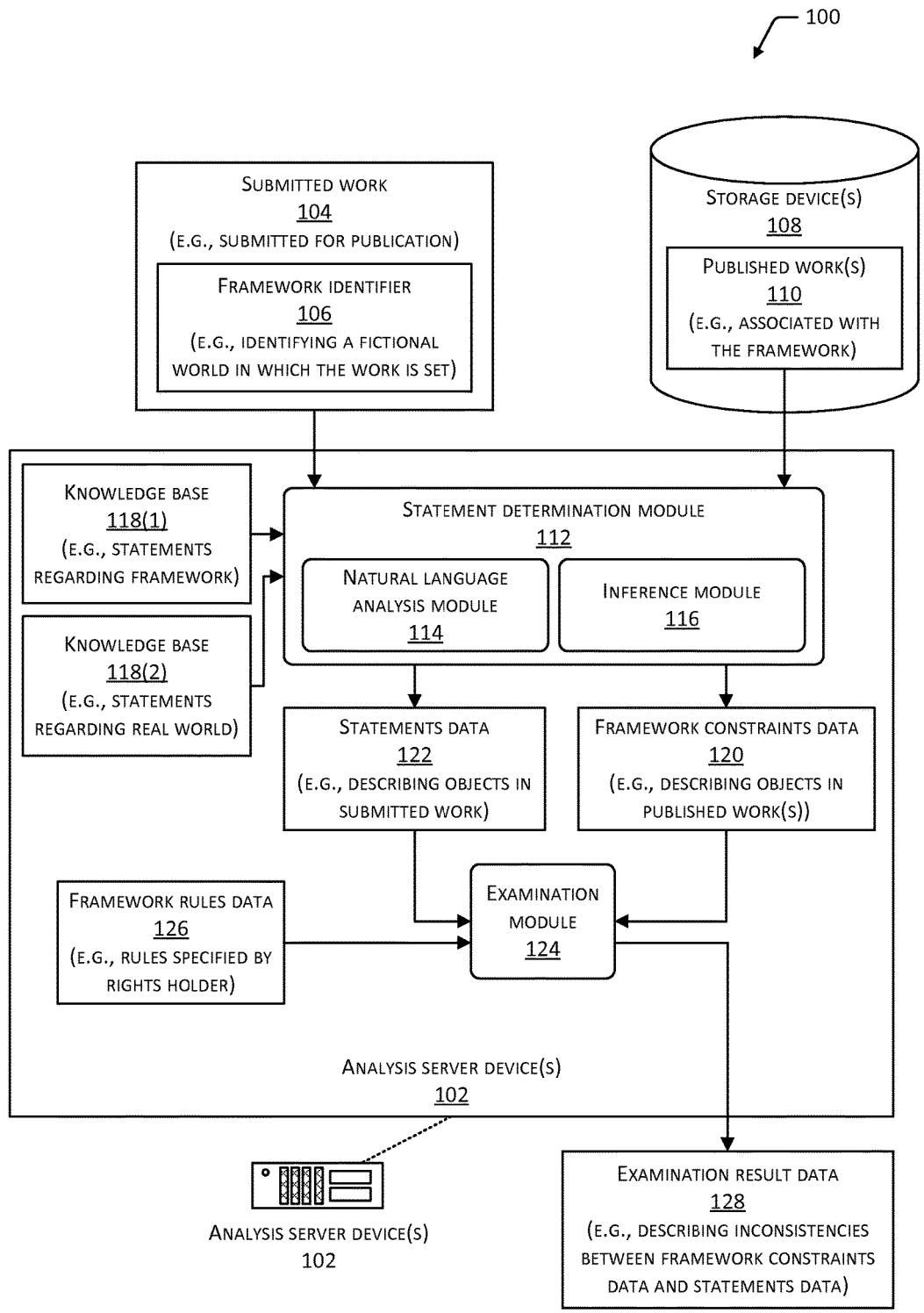
FIG. 1 depicts an environment for analyzing submitted works to determine whether the submitted works are consistent with a framework established in one or more previously published works.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for using natural language processing (NLP) techniques to analyze a submitted work, such as a manuscript, to determine whether the submitted work is consistent with other previously published works. In some cases, a work may be submitted for publication by an author, artist, musician, filmmaker, or other type of creator. The submitted work may be based on a framework that includes one or more previously published works. A framework may be a setting, world, universe, mythology, canon, or milieu created in or otherwise associated with one or more creative works, such as one or more books, plays, poems, other types of literary works, films, songs, television shows, games, other types of audio-visual or graphical works, or other works. As such, a framework may include one or more objects that have been described in previously published works of that framework. Such objects may include characters, locations, concepts, or other entities that were introduced in the previously published works of a framework. For example, a framework may have been created within a series of books that present a narrative regarding a set of objects such as characters, locations, or other entities that are particular to or original to the framework in which the books are set. Objects may include named entities such as proper nouns that describe particular characters, locations, things, and so forth.

In some cases, an author, a publisher, a licensor, or some other party responsible for the copyrights to the framework may open up the framework to enable others to create original works that are set within the framework or that are otherwise derivative of the framework. In such cases, the responsible party may indicate that one or more characters, locations, things, concepts, situations, or other entities in the new works submitted within the framework are to be at least partly consistent with the objects described in the previously published works of the framework. For example, a framework may include a series of books describing the adventures of a character named Libby Jenkins (e.g., the Libby Jenkins world or universe). The rights owner may indicate that new works in this world are to be consistent with previously published works in the description of the Libby Jenkins character as female, alive, a detective, a fan of a particular sports team, and so forth.

In some cases, the rights owner or another party who manages the framework may provide an explicit set of rules governing how the objects within the framework may be used in the newly created works. For example, the rights owner may provide a rule indicating that Libby Jenkins is to be described as alive and female in the newly created works, to retain consistency with the description of Libby Jenkins in the previously published works of the framework. The rules may also more broadly constrain the use of the framework. For example, the rights owner may provide a rule indicating that there may be no violence or explicit romantic content presented in works that are set within the framework. In cases where the rights owner provides rules governing a framework, a publisher or other individual may manually review a submitted work to determine whether the submitted work complies with the rules. Alternatively, the rights owner may not provide an explicit set of rules governing a framework, or the rights owner may provide a set of rules that is limited in scope or specificity. In such cases, a publisher may manually review a submitted work to determine whether the submitted work is generally consistent with the previously published works. Such a manual review process may be time consuming and error-prone.

Implementations provide at least partial automation of the examination of submitted works using NLP methods. In some implementations, one or more previously published works of a framework may be examined, using a NLP-based analysis, to determine a first set of one or more statements describing objects within the work(s). Such objects may include, but are not limited to characters, locations, concepts, entities, and so forth. In some implementations, each statement may include two objects that are nouns or noun phrases, and a relationship between the two objects. For example, a statement may indicate that Libby Jenkins is a female, describing that the objects "Libby Jenkins" and "a female" are coupled through the relationship "is a". As another example, a work in a framework may indicate that Tom is exclusively a fan of a sports team called the Peoria Pomegranates. A statement may be determined in which the objects "Tom" and "Peoria Pomegranates" are coupled through the relationship "is exclusively a fan of". In some implementations, the analysis of the previously published work(s) of a framework may include inferring additional statements based on facts present in a knowledge base that is derived independently of the framework. For example, the knowledge base may include a fact that Peoria is in the state of Illinois in the United States. Based on this fact, and on the statement that Tom is exclusively a fan of a Peoria team, additional statements may be inferred that Tom is exclusively a fan of a sports team in Illinois, and that Tom is exclusively a fan of a sports team in the United States. A statement may also include an object that describes a characteristic or attribute of a noun object, such as an adjective or adjective phrase that describes a noun or noun phrase. For example, a statement may describe that "Libby Jenkins is tall" within the framework of Libby Jenkins works.

In some implementations, the NLP-based analysis of the text content of the submitted or published works may comprise a semantic analysis of the text of such works. A semantic analysis may be directed to the meaning of the text, and may be based on the relationships between words, phrases, symbols, or other data elements included in the text. Such a semantic analysis may take a sentence included in the text of a work and, based on the meaning and arrangement of the words included in the sentence, translate the sentence into one or more statements that each comprises two objects related through a third object that is a relationship. The two objects may be a pair of nouns or noun phrases. In some cases, the two objects may include a first object that is a noun or noun phrase, and a second object that is an adjective or adjective phrase that describes the first object. The object-relationship-object format of the statement may convey semantic information in that the relationship indicates a meaning of the two objects with respect to one another.

One or more of the statements determined through the analysis of the previously published work(s), and determined through inference via a knowledge base, may be designated as constraints that govern usage of objects in works submitted as a part of the framework. Implementations may also perform a similar NLP-based analysis to determine a second set of statements describing the objects present in a work submitted for publication, where the work is associated with the framework. In some implementations, any inconsistencies between the framework constraint(s) and the second set of statements may be designated as possible deviations from the framework, and may be flagged for further examination by the publisher, author, rights owner, or other individual(s). The inconsistencies may also prompt a determination not to publish the submitted work until the inconsistencies are resolved.

In some cases, the work that has been submitted for publication may be a manuscript that includes text data, such as a book, novel, novella, play, poem, song, screenplay, teleplay, or some other types of literary work. The manuscript may be submitted for publication as an electronic book (e-book), for online publication via a web site, or for publication using any other digital or non-digital method. Implementations also provide for the analysis of other types of submitted works such as works that include video content (e.g., films, television, etc.), audio content (e.g., music, spoken word recordings, etc.), image data (e.g., portraits, diagrams, drawings, visual art, etc.), or other types of information.

FIG. 1 depicts an environment 100 for analyzing submitted works associated with a framework. As shown in FIG. 1, the environment 100 may include one or more analysis server devices 102. The analysis server device(s) 102 may comprise any type of computing device, including but not limited to a server computer, a personal computer, a network computer, a distributed computing device (e.g., cloud computing device), a smartphone, a tablet computer, a wearable computer, an implanted computer, a mobile gaming device, an e-book reader, an automotive computer, a desktop computer, a laptop computer, a thin client, a terminal, a game console, a smart appliance, a home entertainment device, and so forth. In some cases, two or more of the analysis server devices 102 may comprise a cluster, cloud, farm, or other grouping of multiple devices that coordinate operations to provide load balancing, failover support, parallel processing capabilities, shared storage resources, or other aspects. The analysis server device(s) 102 are described further with reference to FIG. 2.

In some cases, the analysis server device(s) 102 may provide a direct publishing or self-publishing service that enables authors or other creators to publish manuscripts, video content, audio content, games, or other types of content. Accordingly, one or more authors or other individuals may send, to the analysis server device(s) 102, one or more submitted works 104 for publication. The submitted work(s) 104 may include any type of content. In some cases, the submitted work(s) 104 may include manuscript(s) that comprise fiction writing, non-fiction writing, or both fiction and non-fiction writing. The submitted work(s) 104 may also include other types of works, such as games, music, audio-visual content, image data, and so forth. The submitted work(s) 104 may include content in any format. In some cases, the submitted work(s) 104 may be submitted in a digital format such as one or more of the following: the Portable Document Format (PDF) or PostScript from Adobe Systems of Mountain View, Calif., USA; the DOC or DOCX format from Microsoft Corp. of Redmond, Wash., USA; or plain text.

In some cases, the submitted work(s) 104 may be submitted to the analysis server device(s) 102 for publication as e-book(s). Implementations support the analysis, delivery, and presentation of e-books in any format, including but not limited to any version(s) in the following formats: the Portable Document Format (PDF) or PostScript from Adobe Systems of Mountain View, Calif., USA; the Kindle format from Amazon.com of Seattle, Wash., USA; the iBook format from Apple, Inc. of Cupertino, Calif., USA; the ePub format from the International Digital Publishing Forum (IDFPF); the DOC or DOCX format from Microsoft Corp. of Redmond, Wash., USA; or plain text.

In some cases, the submitted work(s) 104 may be provided to the analysis server device(s) 102 by the original creator(s) of the submitted work(s) 104, such as author(s), artist(s), filmmaker(s), musician(s), performer(s), designer(s), and so forth. Alternatively, the submitted work(s) 104 may be provided by publishers, advertisers, marketing specialists, licensors, rights owners, rights holders, or other parties associated with the submitted work(s) 104.

Implementations support any type or format of data within the submitted work(s) 104, including but not limited to one or more of the following:

Text content, including any amount of alphanumeric or symbolic character text described using any character set or code page, such as any version or subset of the Unicode character standard. Text components may also include metadata described using a markup language, such as any version of Hypertext Markup Language (HTML), Dynamic HTML (DHTML), Extensible HTML (XHTML), Extensible Markup Language (XML), and so forth;

Script files or program modules that provide dynamic content using any scripting or programming language, including any version of Java, C, C++, JavaScript, VBScript, Peri, Common Gateway Interface (CGI), Cascading Style Sheets (CSS), other types of style sheets, and so forth;

Image files in any format, such as a version of the Joint Photographic Experts Group (JPEG) format, the Graphics Interchange Format (GIF), the Bitmap (BMP) image file format, and so forth; or Audio, video, audio-visual, or multimedia content files in any format, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth.

In some cases, the analysis server device(s) 102 may provide a self-publishing or direct publishing service for those authors or others who create new work(s) that are based on, set within, or otherwise associated with an existing framework. As described above, the framework may be a world, setting, universe, mythology, canon or milieu that has been established in one or more previously published works. Such published works may include one or more of the following: published books or other types of manuscripts; broadcast, streamed, or otherwise distributed television shows or films; published, released, or otherwise distributed games or other interactive content; or any other type of content made available to the public. In some cases, published works may include works that are completed and made available to the creator(s) of the submitted work(s) 104 prior to being made available to the public. In some implementations, the submitted work(s) 104 may include a framework identifier 106 that identifies a framework associated with the submitted work(s) 104, e.g., a world in which the submitted work(s) 104 are set. The framework identifier 106 may uniquely identify a framework using a framework name, framework identification number, or any other type of identifying information.

In some implementations, the analysis server device(s) 102 may have access to one or more storage device(s) 108. The storage device(s) 108 may comprise any type of data storage system or datastore, and may be a relational or a non-relational datastore. Implementations support any type or format of data storage for the storage device(s) 108, including but not limited to a file system, a database, an array, a structured list, a tree, a key-value storage, flat files, unstructured data, or any other data structure or format. The analysis server device(s) 102 may store the submitted work(s) 104 on the storage device(s) 108. In some implementations, the storage device(s) 108 may also store one or more published works 110 associated with one or more frameworks. The published work(s) 110 may include any type of work including but not limited to manuscript(s), audio content, video content, audio-visual content, game(s), interactive content, image data, and so forth. The published work(s) 110 may include works that were previously published electronically, such as e-books, digital audio files or video files made available for streaming or download, online content, digital downloads of games, and so forth. The published work(s) 110 may also include works that were published as physical objects, such as books, magazines, compact disks (CDs) or digital video disks (DVDs) storing audio data, video data, games, and so forth. Although FIG. 1 depicts the storage device(s) 108 as external to the analysis server device(s) 102, in some cases the storage device(s) 108 may be at least partly incorporated into the analysis server device(s) 102.

The analysis server device(s) 102 may execute a statement determination module 112 configured to access and analyze the submitted work 104 and the published work(s) 110. In some implementations, the statement determination module 112 includes one or both of a natural language analysis module 114 and an inference module 116. Alternatively, one or both of the natural language analysis module 114 and the inference module 116 may execute separately from the statement determination module 112.

In some implementations, the statement determination module 112 may access one or more knowledge bases 118 stored in memory on the analysis server device(s) 102 or stored externally to the analysis server device(s) 102. A knowledge base 118(1) may include one or more statements that are determined based on a semantic analysis of the published work(s) 110 of a framework, as described further with reference to FIG. 6. Accordingly, the knowledge base 118(1) may comprise a corpus of information regarding the framework.

In some implementations, the statement determination module 112 may also access another knowledge base 118(2) that is a corpus of curated facts that are determined independently of the framework(s). For example, the other knowledge base 118(2) may comprise facts regarding the real world, in contrast to statements that are true within a fictional world. The knowledge base 118(2) may store any type of facts including but not limited to facts regarding geography, history, science, culture, art, sports, mathematics, engineering, politics, law, and so forth. In some cases, the knowledge base 118(2) may include facts that may be considered common-sense facts regarding the real world. For example, the knowledge base 118(2) may include a fact that a person may only be born (e.g., come into physical existence) once, and may thus have one birthplace. Such a fact may be employed in making inferences regarding the birthplace of a character in a work, for example.

The statement determination module 112 may access and analyze the published work(s) 110 associated with a particular framework to determine statements to include in the knowledge base 118(1) for the framework. One or more of the statements included in the knowledge base 118(1) may be designated as constraints and stored in framework constraints data 120. The framework constraints data 120 for a framework may include any number of constraints that govern usage of objects within the framework. In some implementations, the natural language analysis module 114 may employ a semantic analysis, such as one or more NLP algorithms, techniques, or methods, to identify a set of one or more statements present in the published work(s) 110. Each of the statements may include two objects such as characters, locations, named objects, entities, concepts, or other elements of the published work(s) 110. Each of the statements may also include a relationship between the objects. For example, the natural language analysis module 114 may analyze the published work(s) 110 and determine a statement "Tom Walker's favorite food is hot dogs," in which a character "Tom Walker" and an object "hot dogs" are coupled through a relationship "favorite food is". A statement may also include an object that is an adjective describing a trait of another (e.g., noun) object, such as "Tom Walker is brown-haired." Accordingly, the statements determined based on the natural language analysis of the published work(s) 110 may comprise a set of facts that are operative in the framework associated with the published work(s) 110.

In some implementations, the inference module 116 may expand the set of statements determined by the natural language analysis module 114 through one or more inferences based on the facts included in the knowledge base 118(2). For example, the natural language analysis module 114 may extract, from the published work(s) 110, a statement that "Tom Walker lives in Bremen." Based on geographical information included in the knowledge base 118 (2), such as the fact that Bremen is in Germany, the inference module 116 may infer an additional statement that "Tom Walker lives in Germany." In some cases, an inference may include modifying a first statement by substituting at least a portion of the first statement (e.g., "Bremen") with a noun (e.g., "Germany") that encompasses the substituted portion. In some implementations, the knowledge base 118(2) may store one or more statements that describe relationships between objects in the real world, such as the relationship that Bremen is in Germany, and inferences may be made based on such statement(s).

The statement determination module 112 may analyze the statement(s) in the knowledge base 118(1), as determined by the natural language analysis module 114 and the inference module 116, and designate one or more of the statement(s) as constraint(s) that govern the use of objects in the framework. In some implementations, all the statements determined from the published work(s) 110 may be employed as constraints included in the framework constraints data 120. In some implementations, a subset of the statements may be designated as constraint(s) based on a manual review of the statement(s). For example, the statement(s) that occur within the published work(s) 110 more frequently than other statement(s) may be designated as constraint(s). Alternatively, the statement(s) that describe the more frequently occurring objects with a framework may be designated as constraint(s). For example, in the "Tom Walker" framework, the more frequently occurring statement(s) describing Tom Walker may be designated as constraint(s) whereas the less frequently occurring statement(s) describing an unnamed taxi driver may not be designated as constraint(s). The constraint(s) may be stored as framework constraints data 120 on the analysis server device(s) 102 or elsewhere. The framework constraints data 120 may be employed to examine the subsequently submitted work(s) 104 for a framework to ensure consistency with the published work(s) 110 of the framework. In some implementations, one or more of the constraints included in the framework constraints data 120 may override facts present in the knowledge base 118(2). For example, the framework may establish a world in which science, geography, history, or other aspects differ from the real world described in the knowledge base 118(2). The framework constraints data 120 is described further with reference FIG. 4. The determination of the framework constraints data 120 is described further with reference to FIG. 6.

The statement determination module 112 may access and analyze the submitted work 104 to determine statements data 122. The statements data 122 may include any number of statements that describe the actions, characteristics, attributes states, relationships, or other aspects of one or more objects as described in the submitted work 104. In some implementations, the natural language analysis module 114 may employ a semantic analysis, such as one or more NLP algorithms, techniques, or methods, to identify a set of one or more statements present in the submitted work 104. As described above with regard to the determination of the framework constraints data 120, each of the statements may describe an object such as a character, location, thing, concept, or other entity of the submitted work 104. The statement may include a relationship between two objects that are nouns or noun phrases, or between a noun or noun phrase and a descriptive adjective or adjective phrase. Accordingly, the statements determined based on the natural language analysis of the submitted work 104 may comprise a set of statements that are valid within the submitted work 104.

As described above with reference to the determination of the framework constraints data 120, the inference module 116 may expand the set of statements that were determined via the analysis of the submitted work 104 by the natural language analysis module 114. Such expansion may employ one or more inferences based on the facts included in the knowledge base 118(2). The statement(s) determined by the natural language analysis module 114, and inferred by the inference module 116, may be stored in the statements data 122. The statements data 122 is described further with reference to FIG. 3. The determination of the statements data 122 is described further with reference to FIG. 7. The semantic (e.g., NLP) analysis used to determine the statements data 122 and the framework constraints data 120 is described further below and with reference to FIGS. 9 and 10.

The analysis server device(s) 102 may execute an examination module 124 that is configured to access the framework constraints data 120 and the statements data 122. The examination module 124 may also access framework rules data 126. The framework rules data 126 may be stored in memory on the analysis server device(s) 102 or may be stored externally to the analysis server device(s) 102. The framework rules data 126 may specify one or more rules that constrain the use of objects within a particular framework. The rule(s) may have been determined by an author, publisher, rights holder, rights owner, or other individual(s) who are associated with the framework. In some cases, the rule(s) may have been agreed to in a contract between the rights owner and operators of a direct publishing or self-publishing service supported through operations of the analysis server device(s) 102. In some cases, the author or others who submit works within a framework may agree to comply with the rule(s) when they provide the submitted work 104 associated with the framework. For example, the author of a submitted work 104 set in the "Tom Walker" world may agree to a set of rules that constrain the use of the "Tom Walker" world and its objects, and the set of rules may have been determined by one or more parties who manage the copyrights to the "Tom Walker" world. In some implementations, the addition of one or more new rules to the framework rules data 126 may trigger an analysis to determine whether the new rule(s) are consistent with the framework constraints data 120 derived through the analysis of the published work(s) 110.

The examination module 124 may perform operations to compare the statements data 122 to the framework constraints data 120, and identify any inconsistencies between the statements data 122 and the framework constraints data 120. The examination module 124 may also identify any inconsistencies between the statements data 122 and the framework rules data 126. Any identified inconsistencies may be included in examination result data 128. The examination result data 128 may be communicated in a notification to one or more publishers, reviewers, editors, or other individuals who may determine whether the submitted work 104 is to be published. In some cases, inconsistencies between the statements data 122 and the framework constraints data 120, or between the statements data 122 and the framework rules data 126, may delay the publication of the submitted work 104 until such inconsistencies are resolved. The notification may include an indication of a location within the submitted work 104 where each inconsistency is exhibited.

In some cases, inconsistencies may lead to a submitted work 104 being automatically rejected or otherwise delayed from publication, pending a manual examination or pending edits by the author or creators to bring the submitted work 104 into compliance with the framework rules data 126 or the framework constraints data 120. Inconsistencies may also lead to a notification that is sent to inform the author or other creator that a submitted work 104 is inconsistent with the framework rules data 126 or the framework constraints data 120. In such cases, the notification may indicate the particular rule(s) or constraint(s) with which the submitted work 104 is inconsistent.

In some implementations, the comparison of the statements data 122 to the published work(s) 110 may be performed as described in U.S. patent application Ser. No. 13/106,562, titled "Extracting Structured Knowledge From Unstructured Text," which was filed on May 12, 2011 and which is hereby incorporated by reference into the instant application. In such implementations, one or more of the statements included in the statements data 122 may be posed as a natural language question that is answered through a natural language analysis of the published work(s) 110 for a framework. For example, a statement "Libby Jenkins enjoys eating peaches" may be extracted from the submitted work 104, and translated to a question "Does Libby Jenkins enjoy eating peaches?" Through techniques described in the above-referenced patent application, a natural language analysis may be performed on the published work(s) 110 to determine an answer to that question. Continuing the example, if the published work(s) 110 include a description indicating that Libby Jenkins does not enjoy eating peaches, is allergic to peaches, or exclusively enjoys eating some other type of fruit, the answer to the question may be negative. Accordingly, the examination result data 128 may then be generated to describe an inconsistency between the published work(s) 110 and the submitted work 104 regarding Libby Jenkins' enjoyment of peaches.

The answering of the question may involve one or more inferences. For example, the published work(s) 110 may indicate that Libby Jenkins exclusively enjoys eating apples and does not enjoy other types of fruit. A negative answer may be inferred to the question "Does Libby Jenkins enjoy eating peaches?" based on the indication that "Libby Jenkins exclusively enjoys eating apples" and based on the facts that an apple is a fruit, a peach is a fruit, and an apple is not a peach. Alternatively, in some implementations the natural language analysis may translate one or more sentences of the submitted work 104 into statements of the format object-relationship-object, where the relationship conveys semantic information regarding the two objects. Such statements may then be compared to other statements derived from the published work(s) 110 of a framework, to identify inconsistencies. The analyzing of the submitted work 104 via natural language based analysis is described further with reference to FIG. 11.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 2:
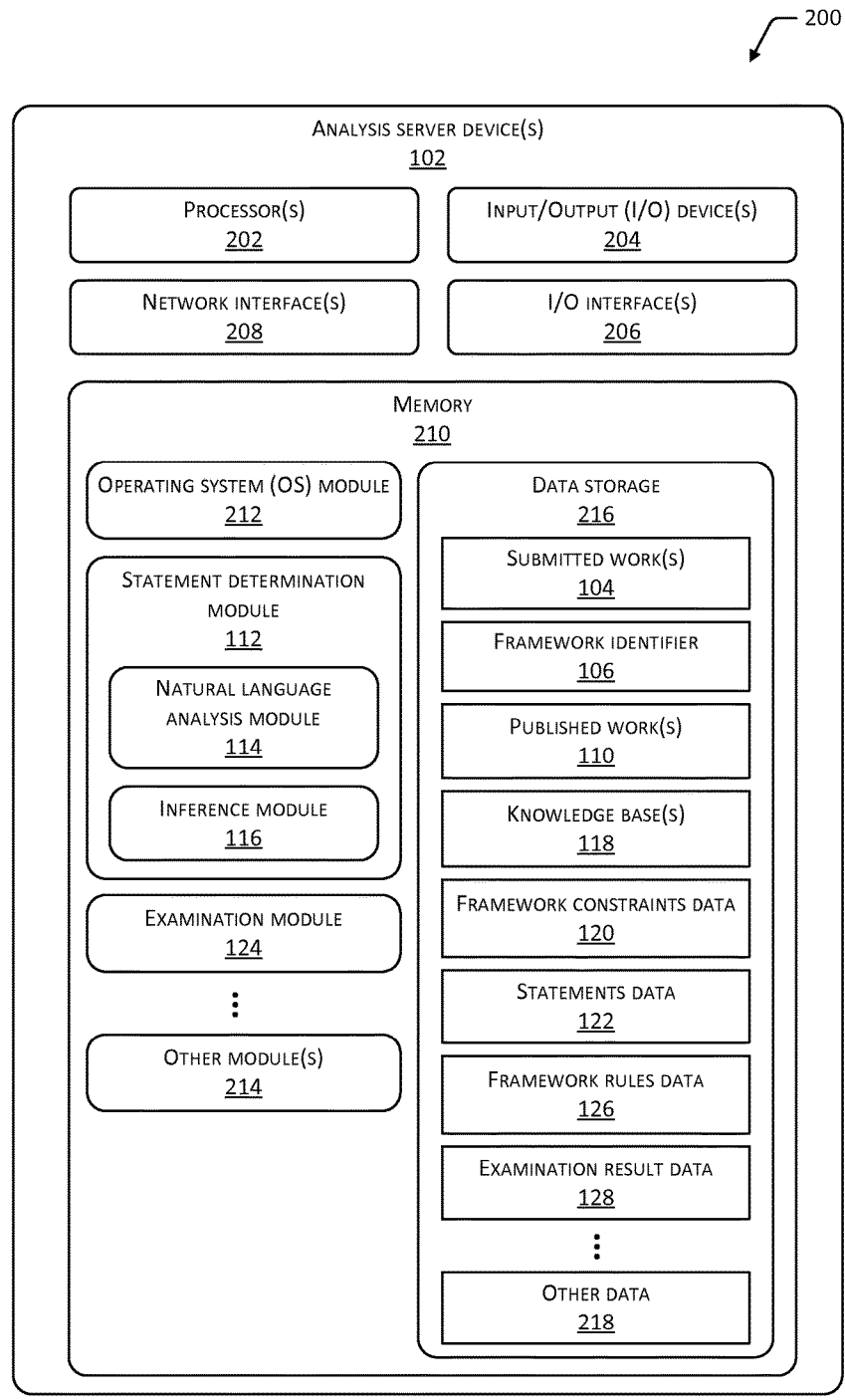
FIG. 2 depicts a block diagram of an example analysis server device configured to determine one or more constraints governing objects in a framework, and to analyze a submitted work to determine whether the submitted work complies with the constraint(s).

FIG. 2 depicts a block diagram 200 of an example of the analysis server device(s) 102. As shown in the block diagram 200, the analysis server device 102 may include one or more processors 202 (e.g., hardware-based processor(s)) configured to execute one or more stored instructions. The processor(s) 202 may comprise one or more cores.

The analysis server device 102 may include one or more input/output (I/O) devices 204. The I/O device(s) 204 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 204 may also include output devices such as a display, an audio output device (e.g., a speaker), a printer, a haptic output device, and so forth. The I/O device(s) 204 may be physically incorporated with the analysis server device 102, or may be externally placed.

The analysis server device 102 may include one or more I/O interfaces 206 to enable components or modules of the analysis server device 102 to control, interface with, or otherwise communicate with the I/O device(s) 204. The I/O interface(s) 206 may enable information to be transferred in or out of the analysis server device 102, or between components of the analysis server device 102, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The analysis server device 102 may also include one or more busses or other internal communications hardware or software that allow for the transfer of data between the various modules and components of the analysis server device 102.

The analysis server device 102 may include one or more network interfaces 208 that enable communications between the analysis server device 102 and other network accessible computing devices, such as the storage device(s) 108. The network interface(s) 208 may include one or more network interface controllers (NICs) or other types of transceiver devices configured to send and receive communications over a network.

The analysis server device 102 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions that may describe data structures, program modules, processes, applications, or other data for the operation of the analysis server device 102. In some implementations, the memory 210 may provide storage of computer-readable instructions or other information in a non-transitory format.

The memory 210 may include an operating system (OS) module 212. The OS module 212 may be configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux operating system; any version of iOS from Apple Corp. of Cupertino, Calif., USA; any version of Windows or Windows Mobile from Microsoft Corp. of Redmond, Wash., USA; any version of Android from Google Corp. of Mountain View, Calif., USA and its derivatives from various sources; any version of Palm OS from Palm Computing, Inc. of Sunnyvale, Calif., USA and its derivatives from various sources; any version of BlackBerry OS from Research In Motion Ltd. of Waterloo, Ontario, Canada; any version of VxWorks from Wind River Systems of Alameda, Calif., USA; or other operating systems.

The memory 210 may include one or more of the modules described above as executing on the analysis server device 102, such as one or more of the statement determination module 112, the natural language analysis module 114, the inference module 116, or the examination module 124. The memory 210 may also include one or more other modules 214, such as a user authentication module or an access control module to secure access to the analysis server device 102, and so forth.

The memory 210 may include data storage 216 that stores data for operations of the analysis server device 102. The data storage 216 may comprise any number of file systems, databases, arrays, structured lists, trees, or other data structures, and may include one or more relational or non-relational datastores. The data storage 216 may store the data described above as present on or accessed by the analysis server device(s) 102, including one or more of the submitted work(s) 104, the framework identifier 106, the published work(s) 110, the knowledge base(s) 118, the framework constraints data 120, the statements data 122, the framework rules data 126, or the examination result data 128. The data storage 216 may also store other data 218, such as user authentication information or access control data. In some implementations, at least a portion of the information stored in the data storage 216 may be stored externally to the analysis server device 102, on other devices that may communicate with the analysis server device 102 via the I/O interface(s) 206 or via the network interface(s) 208.

Figure 3:
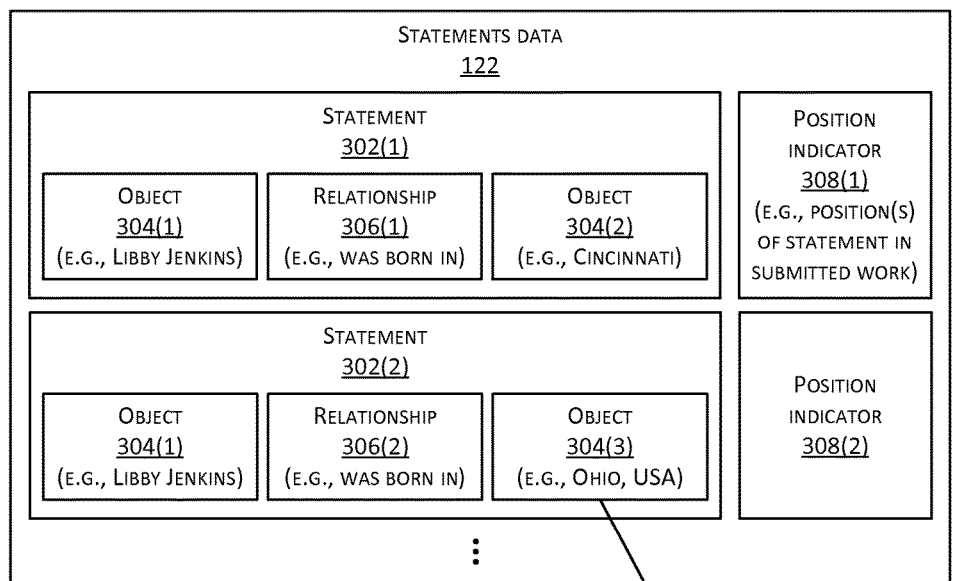
FIG. 3 depicts an example schematic of statements data, including one or more statements determined based on analysis of a submitted work.

FIG. 3 depicts a schematic 300 of an example of the statements data 122 that may be generated based on a semantic analysis of the submitted work 104 and inferred based on facts in the knowledge base 118(2). The statements data 122 may include any number of statements 302 that each describes an action, state, characteristic, relationship, or other aspect of an object 304 in the submitted work 104. As shown in the example schematic 300, a statement 302 may include two objects 304. As described above, an object 304 may include a noun such as a character, location, concept, or other entity present in the submitted work 104. The noun may be a proper noun, such as a named entity within analyzed text. The statement 302 may also include a relationship 306 between the objects 304. For example, in the statement 302(1) "Libby Jenkins was born in Cincinnati," "Libby Jenkins" is an object 304(1) (e.g., a character), "Cincinnati" is the object 304(2), and the relationship "was born in" associates the object 304(1) with the object 304(2). The submitted work 104 may include one or more portions of text that include the information that Libby Jenkins was born in Cincinnati, prompting the natural language analysis module 114 to extract the statement 302(1) based on part-of-speech (POS) tagging, named entity recognition analysis, or some other NLP algorithm. The object 304(2) may be a noun or noun phrase that is associated with the object 304(1) via the relationship 306. Alternatively, in some cases the object 304(2) may be an adjective or adjective phrase that describes the object 304(1).

In some cases, the statements 302 may be extracted from the submitted work 104 through a NLP analysis of the text of the submitted work 104, as in the example statement 302(1). The statements data 122 may also include any number of additional statements 302 that are inferred based on fact(s) present in the knowledge base 118(2). For example, the inference module 116 may access the knowledge base 118(2) to determine a fact that Cincinnati is in the state of Ohio in the United States. Applying that fact to the statement 302(1) "Libby Jenkins was born in Cincinnati," the inference module 116 may determine an additional statement 302(2) "Libby Jenkins was born in Ohio" or "Libby Jenkins was born in the United States." In some cases, an inference may include modifying a first statement by substituting at least a portion of the first statement (e.g., "Cincinnati") with an object 304 (e.g., "Ohio" or "United States") that encompasses the substituted portion, that is synonymous with the substituted portion, or that is otherwise related to the substituted portion.

In some implementations, the statements data 122 may also include a position indicator 308 that describes a position, within the submitted work 104, of the information that was the source of one or more of the statements 302. In cases where the submitted work 104 is a manuscript including text data, the position indicator 308 may describe the position as a character number, line number, page number, chapter number, percentage through the manuscript, and so forth. In cases where the submitted work 104 includes audio or video content, the position indicator 308 may describe the position as a percentage through the work, a time indication, a frame number, and so forth. The position indicator 308 may indicate any number of positions that were the source of the statement 302 within the submitted work 104.

Figure 4:
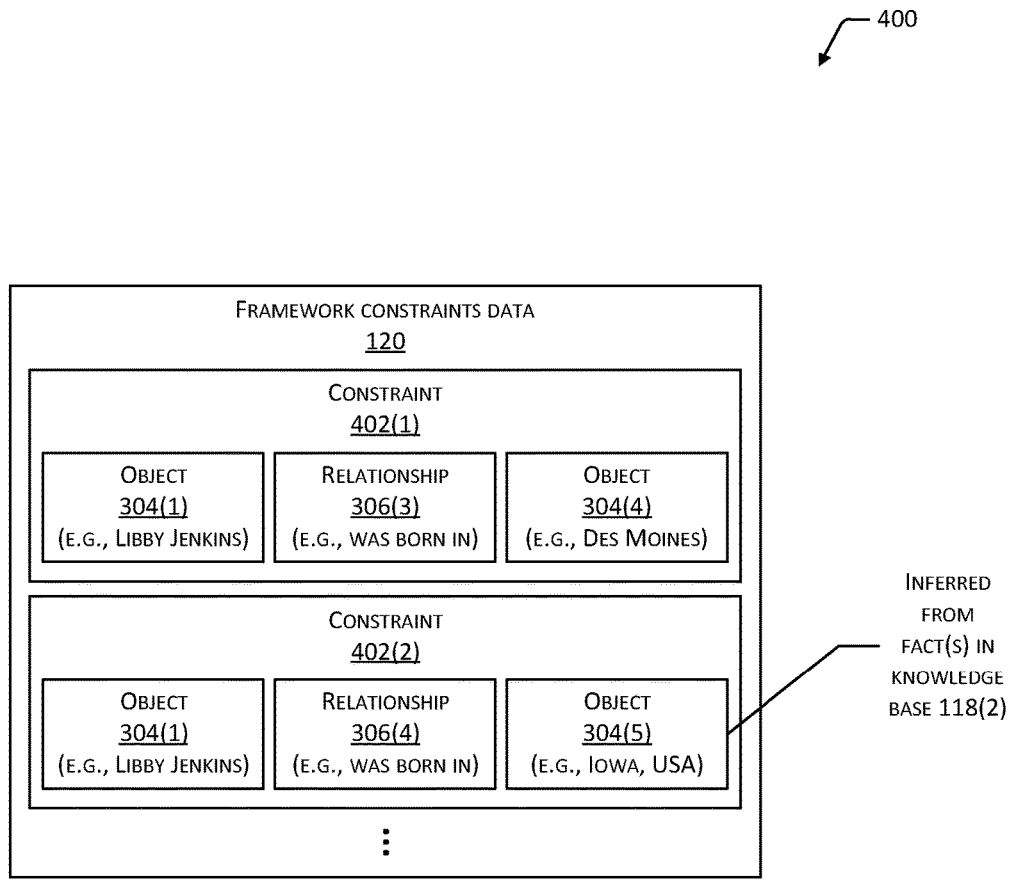
FIG. 4 depicts an example schematic of framework constraints data, including one or more constraints determined based on analysis of published works associated with a framework.

FIG. 4 depicts a schematic 400 of an example of the framework constraints data 120 that may be generated based on a NLP analysis of the published work(s) 110 associated with a framework and inferred based on fact(s) in the knowledge base 118(2). The framework constraints data 120 may include any number of constraints 402 that each describes an action, state, characteristic, relationship, or other aspect of an object 304 in the published work(s) 110 of a framework. As shown in the example schematic 400, a constraint 402 may include two objects 304 and a relationship 306 that associates the objects 304. As described above with reference to FIG. 3, the object 304(2) may be a noun or noun phrase such as a character, location, thing, or other entity present in the published work(s) 110. The object 304(2) may also be an adjective or adjective phrase that describes the object 304(1). The framework constraints data 120 may include constraint(s) 402 that are determined based on a NLP analysis of the published work(s) 110. The framework constraints data 120 may also include additional constraint(s) 402 that are inferred via the modification of the NLP-determined constraint(s) 402 based on facts present in the knowledge base 118(2), as described with reference to FIG. 3.

Figure 5:
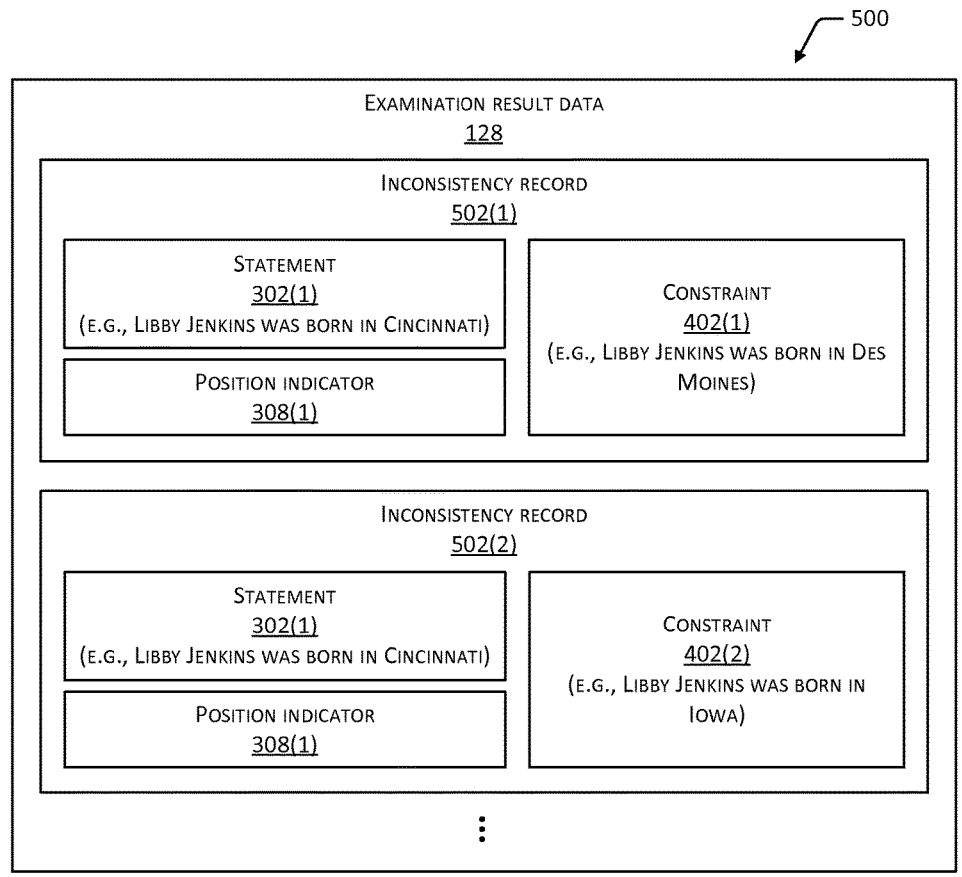
FIG. 5 depicts examples of examination result data that describes one or more inconsistencies between the statements data and the framework constraints data.

FIG. 5 depicts a schematic 500 of an example of the examination result data 128. The examination result data 128 may include any number of inconsistency records 502 that each describes an inconsistency between a statement 302 and a constraint 402. The examination result data 128 may also include any number of inconsistency records 502 that each describes an inconsistency between a statement 302 and a rule present in the framework rules data 126. An inconsistency record 502 may describe an inconsistency between a statement 302 and a constraint 402 that is derived based on the NLP analysis of the published work(s) 110, such as the example constraint 402(1) "Libby Jenkins was born in Des Moines." An inconsistency record 502 may also describe an inconsistency between a statement 302 and a constraint 402 that is inferred based on statement(s) in the knowledge base 118(1) or the knowledge base 118(2), such as the example constraint 402(2) "Libby Jenkins was born in Iowa," e.g., inferred based on a fact that Des Moines is in the state of Iowa in the United States. In some implementations, the inconsistency record 502 may include the position indicator 308 indicating a position, in the submitted work 104, of the information that is the origin of the inconsistent statement 302. Such a position indicator 308 may enable reviewer(s), editor(s), author(s), or other individual(s) to investigate and in some cases correct the data in the submitted work 104 that led to the inconsistency. The inconsistency record 502 may also describe the position(s) in the published work(s) 110 from which the constraint 402 was determined. FIG. 5 also includes an example 504 of the examination result data 128 that may be sent to the reviewer(s), editor(s), author(s), and so forth.

Although FIGS. 3-5 depict examples of the statements data 122, the framework constraints data 120, and the examination result data 128 that include particular sets of data in a particular arrangement, implementations are not limited to these examples. The statements data 122, the framework constraints data 120, and the examination result data 128 may include more or less information than depicted, and may include any type of data arranged according to any format or data structure.

Figure 6:
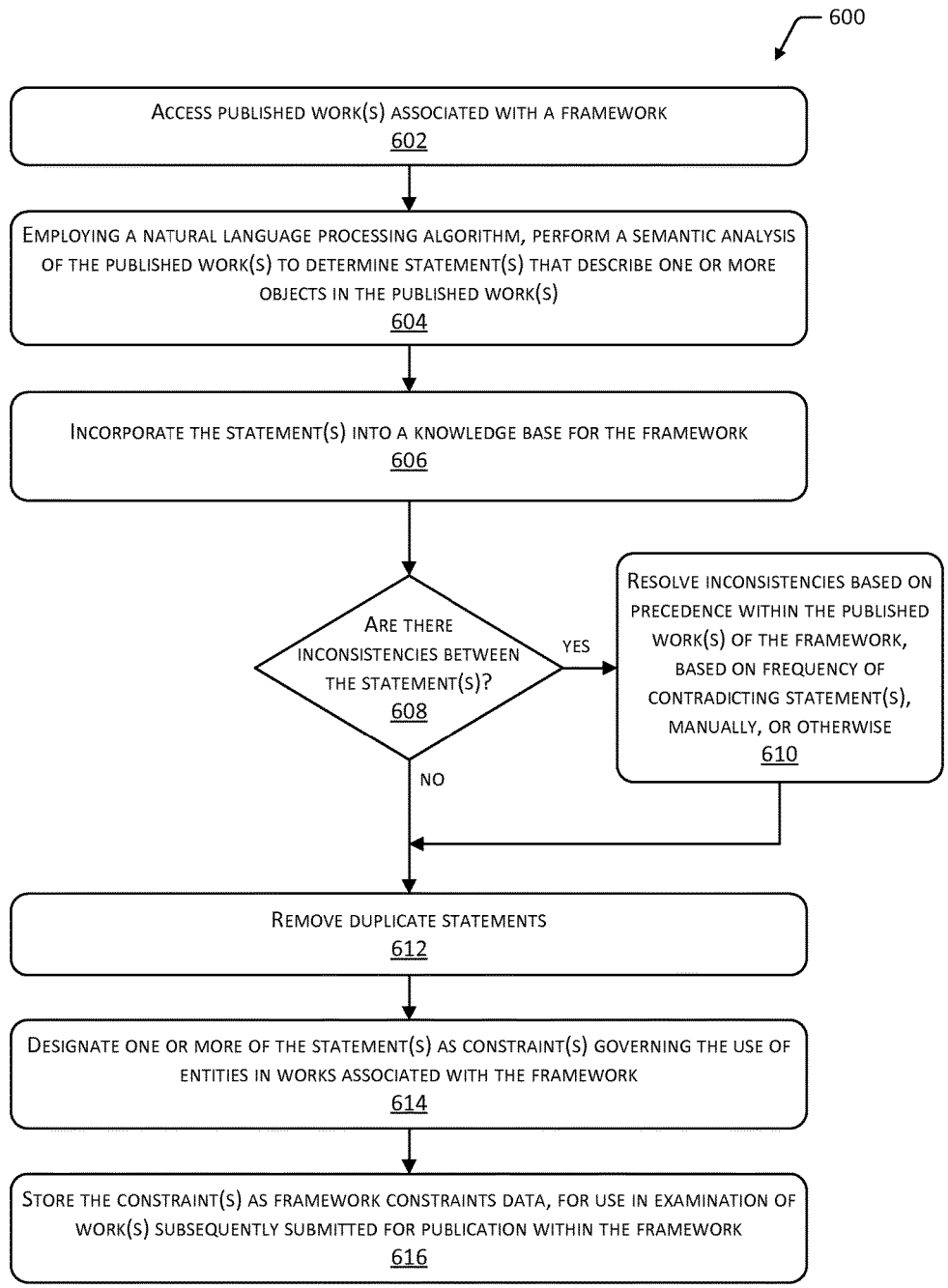
FIG. 6 depicts a flow diagram of a process for generating the framework constraints data.

FIG. 6 depicts a flow diagram 600 of a process for generating the framework constraints data 120. One or more operations of the process may be performed by the statement determination module 112, the natural language analysis module 114, the inference module 116, or other modules executing on the analysis server device(s) 102 or elsewhere.

At 602, one or more published works 110 are accessed from the storage device(s) 108 or elsewhere. The published work(s) 110 may be associated with a framework.

At 604, the published work(s) 110 may be analyzed to determine a set of one or more statements 302 that describe one or more objects 304 in the published work(s) 110. In some implementations, the analysis of the published work(s) 110 may employ a semantic analysis such as NLP to analyze text data included in the published work(s) 110. In cases where the published work(s) 110 include audio or video content, the analyzing of the published work(s) 110 may include transcribing at least a portion of the published work(s) 110 using speech recognition software or other methods. The semantic analysis may then be employed to analyze transcripts or other text data derived from the audio or video content.

At 606, the statements 302 may be incorporated into the knowledge base 118(1). In some implementations, the knowledge base 118(1) may be expanded through inferences based on other statements, such as facts that are operative in a non-fictional world (e.g., real world facts). Such facts may be stored in the knowledge base 118(2) that is derived independently of the knowledge base 118(1) for the framework. In some cases, inference may include modifying a statement 302, based on a fact to generate another statement 302. For example, through semantic analysis a statement 302(1) "Tom Walker does not like Brussels sprouts" may be determined based on text present in one or more published works 110. A fact may indicate that "Brussels sprouts are a vegetable." Based on the statement 302(1) and the fact, an additional statement 302(2) may be inferred "Tom Walker does not like at least one type of vegetable."

At 608, the statements 302 determined at 604 and 606 may be analyzed to determine whether any of the statements 302 contradict one or more other statements 302. The presence of contradictions may indicate that the published work(s) 110 include content that is inconsistent with regard to one or more characters, locations, or other entities. If no contradictions are present with the set of statements 302, the process may proceed to 612. If contradictions are present, the process may proceed to 610.

At 610, the inconsistencies may be resolved by removing or modifying at least one inconsistent statement 302 from the set of statements 302 in the knowledge base 118(1). In some implementations, the inconsistencies may be resolved based on precedence within the published work(s) 110. For example, statements 302 derived from books may be selected instead of contradictory statements 302 derived from television or film content. As another example, statements 302 derived from later published works may be selected instead of contradictory statements 302 derived from earlier published works. Alternatively, earlier works may have precedence over later works. In some implementations, the inconsistencies may be resolved based on the frequency, or the number of occurrences, of the statements 302 within the published work(s) 110. In some cases, the more frequently occurring statements 302 may be retained in the set of statements 302. For example, a statement 302 that occurs 100 times within the published work(s) 110 may be selected instead of a contradictory statement 302 that occurs once. In some cases, the inconsistencies may be resolved through a manual examination of the contradictory statements 302 to determine which statement(s) 302 to retain.

At 612, the set of statements 302 may be analyzed to remove any statements 302 that are duplicates of other statements 302 in the knowledge base 118(1).

At 614, one or more of the set of statements 302 in the knowledge base 118(1) may be designated as constraint(s) 402 governing the use of one or more objects 304 in works associated with the framework. In some cases, all of the statements 302 may be designated as constraint(s) 402. Alternatively, one or more of the statements 302 may be selected as constraint(s) 402. Such selection may be through a manual examination of the statements 302.

At 616, the constraint(s) 402 may be stored as the framework constraints data 120 for use in the examination of submitted work(s) 104 that are associated with the framework. Implementations enable the generation of any number of sets of framework constraints data 120 associated with any number of frameworks.

Figure 7:
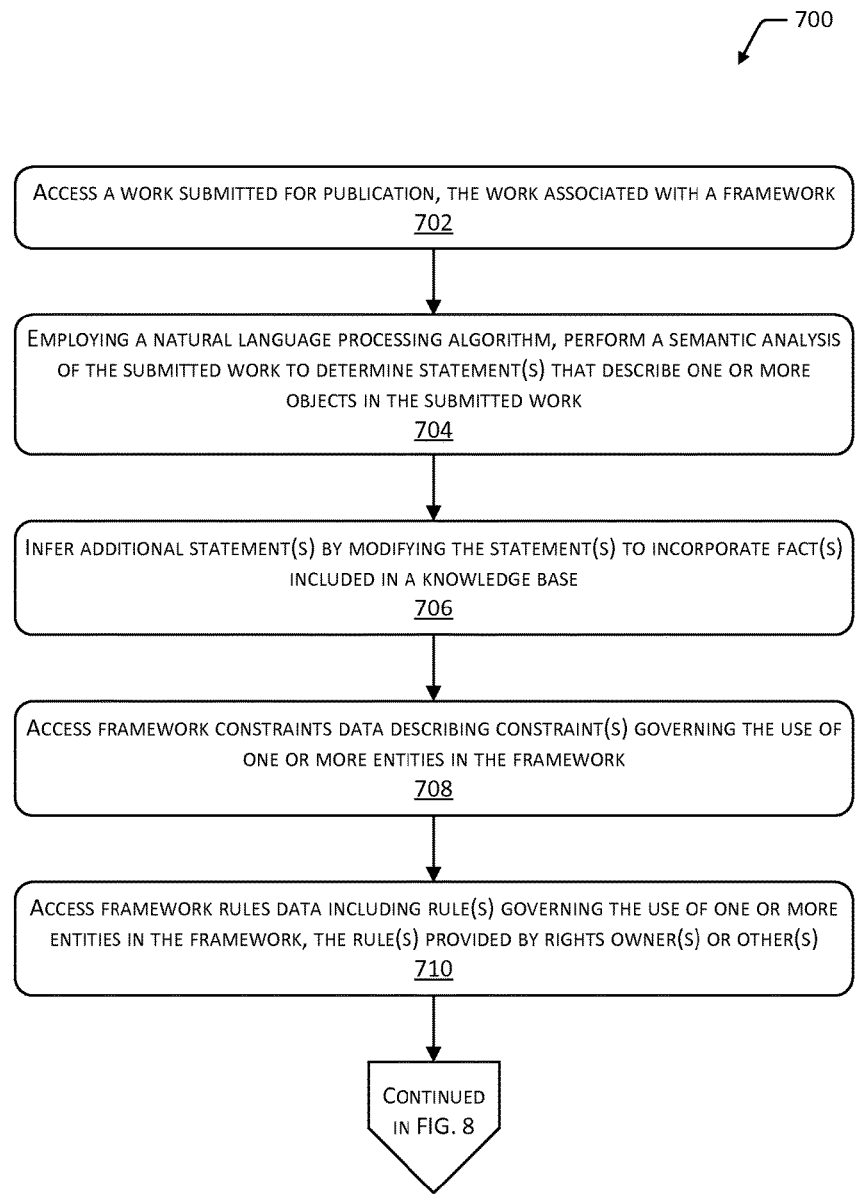
FIG. 7 depicts a flow diagram of a process for generating the statements data and determining inconsistencies between the statements data and the framework constraints data.
Figure 8:
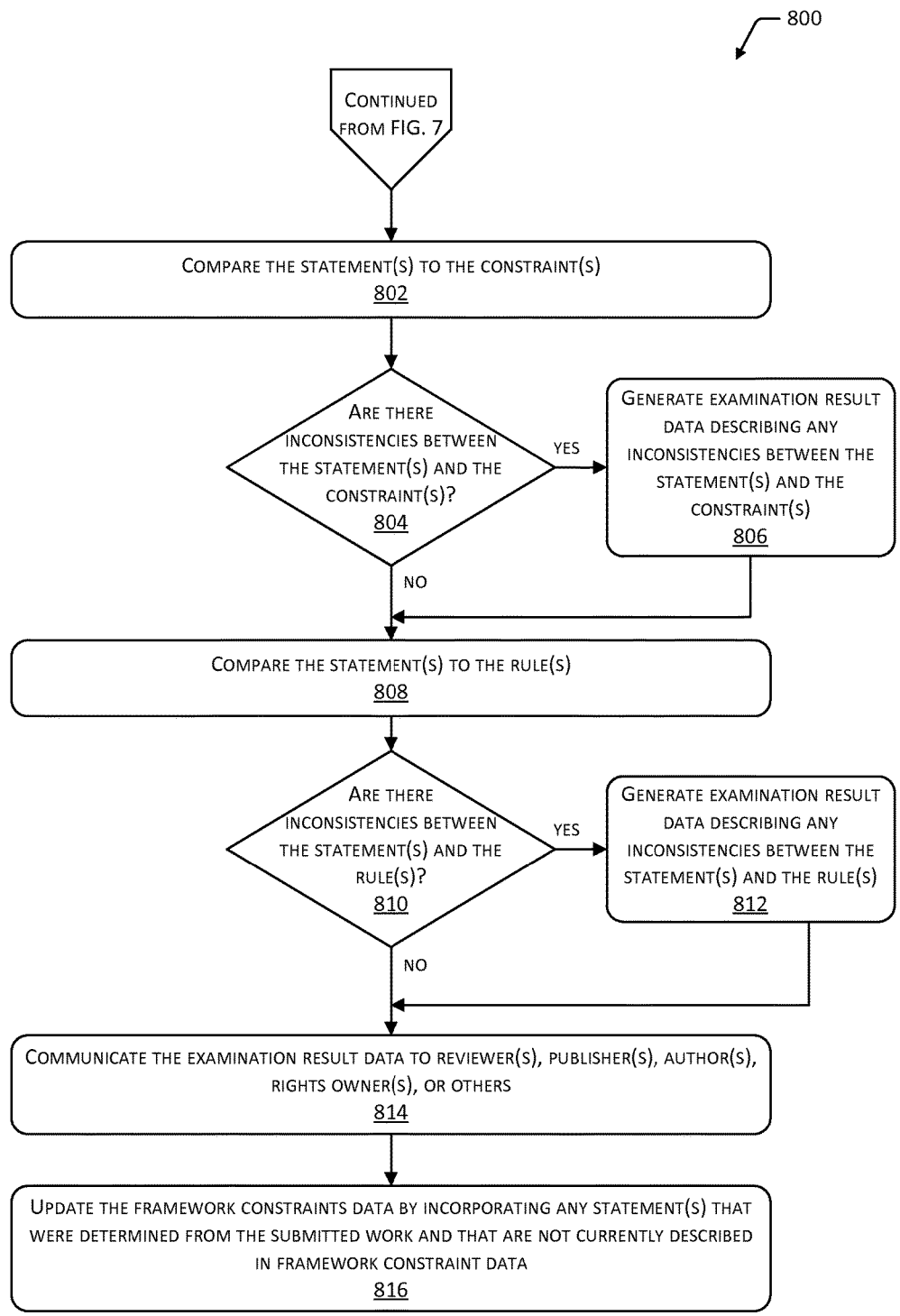
FIG. 8 depicts a flow diagram of a continuation of the process for generating the statements data and determining inconsistencies between the statements data and the framework constraints data.

FIGS. 7 and 8 depict flow diagrams 700 and 800 of a process for generating the statements data 122 and determining inconsistencies between the statements data 122 and one or both of the framework constraints data 120 and the framework rules data 126. One or more operations of the process may be performed by the statement determination module 112, the natural language analysis module 114, the inference module 116, the examination module 124, or other modules executing on the analysis server device(s) 102 or elsewhere.

At 702, a submitted work 104 may be received or otherwise accessed. As described with reference to FIG. 1, the submitted work 104 may include a framework identifier 106 indicating a framework in which the submitted work 104 is set.

At 704, the submitted work 104 may be analyzed to determine one or more statements 302 that describe one or more objects 304 in the submitted work 104. In some implementations, the analysis may employ one or more NLP techniques or algorithms. In cases where the submitted work 104 includes audio, video, or game content, at least a portion of the submitted work 104 may be transcribed using speech recognition software or other methods. NLP may then be employed to analyze the transcripts or other text data derived from the transcribing of the audio, video, or game content.

At 706, one or more additional statements 302 may be inferred based on facts present in the knowledge base 118(2). As described above, such inferences may include modifying one or more of the statements 302 determined at 704 by incorporating one or more facts from the knowledge base 118(2) in the statement(s) 302. The statements 302 determined at 704 and 706 may be included in the statements data 122.

At 708, the framework constraints data 120 for the framework may be accessed. The framework constraints data 120 may include one or more constraints 402 that govern the use of objects 304 within the framework.

At 710, the framework rules data 126 may be accessed. In some implementations, an author, publisher, rights holder (e.g., licensee), rights owner, or others associated with the framework may provide one or more rules governing the use of objects 304 such as characters, locations, things, or other entities within the framework. The process may continue as described with reference to FIG. 8.

At 802, one or more of the statements 302 in the statements data 122 may be compared to one or more of the constraints 402 in the framework constraints data 120. At 804, a determination is made whether there are any inconsistencies between the statements 302 and the constraints 402. If there are no inconsistencies, the process may proceed to 808. If there are inconsistencies, the process may proceed to 806 and generate the examination result data 128 describing the inconsistencies. The process may then proceed to 808.

At 808, in cases where the framework rules data 126 has been provided by a rights owner or other party, one or more of the statements 302 in the statements data 122 may also be compared to one or more of the rules in the framework rules data 126. At 810, a determination is made whether there are any inconsistencies between the statements 302 and the rules. If there are no inconsistencies, the process may proceed to 814. If there are inconsistencies, the process may proceed to 812 and generate the examination result data 128 describing the inconsistencies. The process may then proceed to 814.

At 814, the examination result data 128 may be communicated to one or more reviewers, publishers, editors, or other parties responsible for determining whether to publish the submitted work 104. The examination result data 128 may also be communicated to the creator (e.g., author) of the submitted work 104, to a rights owner of the framework, or other parties. The examination result data 128 may be communicated using any method, such as email, text message, presentation through a web site, and so forth. In some implementations, a report may be generated that includes the examination result data 128.

In some cases, the submitted work 104 may be a game or may otherwise include content that enables interactions between the user and the submitted work 104. In such cases, the submitted work 104 may include any number of narratives, storylines, or paths that the user may traverse based on decisions made by the user or the game logic. In such cases, the identification of inconsistencies between the statements data 122 and the framework constraints data 120, or the framework rules data 126, may identify inconsistencies present in at least one of the narratives or paths available in the submitted work 104.

In some implementations, one or more of the rules in the framework rules data 126, or one or more of the constraints 402 in the framework constraints data 120, may be associated with a severity level that indicates an action that may be taken if the submitted work 104 is inconsistent with a rule or a constraint 402. For example, a high severity level may indicate that the submitted work 104 is to be automatically barred from publication if it includes an inconsistency, at least until the inconsistency is corrected in the submitted work 104. Alternatively, a low severity level may indicate that the inconsistency is to be flagged for review by an author or reviewer.

At 816, in some implementations the framework constraints data 120 may be updated to incorporate one or more of the statements 302 that were determined at 704 or 706 based on the analysis of the submitted work 104. The incorporated statement(s) 302 may include those statement(s) 302 that are consistent with one or both of the existing framework constraints data 120 and the framework rules data 126, and that are not already described as constraints 402 in the framework constraints data 120. In this way, implementations may enable the content of the submitted work 104 to be incorporated into the framework, such that subsequently submitted works may be checked for consistency with the submitted work 104.

In some implementations, NLP may be employed to extract the statements 302 from the submitted work 104 and to determine the constraints 402 based on the published work(s) 110 associated with a framework. Implementations support the use of any NLP techniques or algorithms to analyze the submitted work 104 and the published work(s) 110 and determine the statements data 122 and the framework constraints data 120. The employed NLP techniques or algorithms may include, but are not limited to, one or more of the following: POS tagging, parse tree determination, named entity recognition, relationship extraction to determine the relationship(s) 306 between objects 304, morphological segmentation, or other methods. Some implementations may also employ supervised or unsupervised machine learning techniques to generate the statements data 122 and the framework constraints data 120.

As part of the NLP analysis, implementations may identify the objects 304, and the relationships 306 that relate pairs of objects 304. In some implementations, a distinction may be made between an instance of an object 304 and a class of an object 304. A class may include any number of instances. For example, an object 304 "Tom Walker" may be an instance of an object 304 that is a class "human being," such that "Tom Walker" is a particular instance of "human being." In some cases, an instance of a class may be designated using a definite or indefinite article. For example, "an apple" may be an instance of a class "apples."

In some implementations, a plural form of a noun may be disregarded by the NLP analysis, and the objects 304 may be considered to be unique and singular. For example, a phrase such as "ten trees" may correspond to a single instance of the class "trees" where the constituents of that class object 304 are ten unspecified instances of the object 304 "tree."

In some implementations, one or more of the identified objects 304 present in the submitted work 104 or the published work(s) 110 may be given a name. The name may be unique and, in some cases, may correspond to an English language noun or noun phrase for the object 304. Instances of an object 304 may be assigned the English proper name for the object 304, if such a proper name exists. If the proper name is not unique then a noun phrase may be used, where the noun phrase includes the proper name. In some implementations, the names may include spaces such that they read similarly to English or some other natural language. Although examples herein are described using the natural language English, implementations are language agnostic and not limited to any particular natural language.

Some implementations may distinguish between objects 304 that may otherwise be assigned the same name, by adding an integer at the end of the name (e.g., after a space). In some cases, if a name does not include an integer it may be assumed to be 1 so that newly defined objects 304 may start their numbering with 2. For example, [Tom Walker] may be the object name for the character Tom Walker, and [Tom Walker 1] may be the object name for an object 304 associated with another character Tom Walker. If yet another Tom Walker is present in the analyzed text, that Tom Walker may be associated with an object 304 named [Tom Walker 2], and so forth.

Names may be case insensitive. For example, [Tom Walker] may be the same object 304 as [tom walker]. Examples herein may denote the names of objects 304 as being within brackets, even though the brackets themselves may not be included in the name of an object 304. The name of an object 304 may be unique among the objects 304 present in the published works 110 and the submitted work 104. In some cases, the name may be determined based on an inference via the facts of the knowledge base 118(2). For example, the knowledge base 118(2) may include a fact that "Tom" is a shortened form of the name "Thomas," enabling an inference that the name of an object 304 [Tom Walker] is the same as an object 304 [Thomas Walker].

The above syntax may be unrelated to the ontology used or the class of the object 304. In some cases, instances of a class of strings (e.g., a sequence of characters) may be the string itself put in quotes. For example, ["William"] may be the name for the sequence of characters 'W' . . . 'i' . . . 'l' . . . 'l' . . . 'i' . . . 'a' . . . 'm'. Such object(s) 304 may be employed for stating information for translation and for parameterized objects 304, as described below.

A class may include any number of instance objects 304, and may include a large number of instance objects 304. In some cases, objects 304 may be denoted using a combination of the class name and data, given that it may not be practical to identify and manually name each instance object 304 included in a class. In some implementations, the syntax of such a parameterized object 304 is:

[<class name>: [object 1]; [object 2]; . . . ; [object n]]

Parameterized objects 304 may have at least one object 304 within the name as a parameter. The number of parameters may be fixed for a particular class, such as with a timepoint for a moment in time, or may vary such as with a group for a collection of objects 304 regarded as a single object 304. A timepoint comprises data that describes a particular moment in time, such as a date and time of day, to any degree of specificity. For example a timepoint may specify one or more of a year, a month, a day, an hour, a minute, a second, a tenth of a second, a hundredth of a second, and so forth. A timepoint may also comprise data that describes a duration of time between one moment and another moment.

For some objects 304, a string that includes descriptive information may be used as the parameter(s), such as in cases where there is a "real-world" syntax for members of the class. An example is the class of integers, e.g., [Integer: ["8128"]]. Integers have a universal syntax and meaning based on the use of the digits 0-9 in sequence within the decimal numbering system. Thus an integer may be denoted using a single string object as the parameter. As another example, a standard method exists for denoting chess positions as strings, including other information such as the side to move and castling rights, e.g. [chess position: ["R7/5p1p/5Kp1/8/k6P/p1r5/2P5/8 b - -"]]. Such standards for description may be employed by implementations to name objects 304.

Another class of parameterized objects 304 used in implementations is the timepoint class. In some implementations, the format of a timepoint class may include a sequence of integers separated by "/" characters, denoting the year, the month, the day, the hour in a 24-hour clock, the minute, the second, the tenth of a second, the hundredth of a second, the thousandth of a second, and so forth. For example, [timepoint: ["1999/6/3/15/0"]] may indicate 3:00 pm on Jun. 3, 1999 Coordinated Universal Time (UTC). In this example, the accuracy of the timepoint may be within one minute. As another example, the [timepoint: ["1999"]] may specify a time with an accuracy of one year.

Parameterized objects 304 may be compared to one another by comparing each parameter in turn. If the nature of the class is such that order of parameters is not significant (e.g., as in a group), the parameters may be considered in a predetermined order (e.g., in alphabetical order) so that the same objects 304 may be evaluated as equal regardless of an arbitrary ordering of their parameters.

Parameterized objects 304 may also have other parameterized objects 304 as parameters. This nested nature of parameterized objects 304 may be extended to any depth. For example, a class "pair" may be defined for objects 304 that include two things, e.g. [pair: [integer: ["5"]; [integer: ["7"]]. Such an object 304 may be included in a group object 304 with another object 304. For example, [group: [pair: [integer: ["5"]]; [integer: ["7"]]]; [Tom Walker]] is an object 304 including the pair (5,7) and Tom Walker.

In some implementations, creating a parameterized object 304(1) includes determining the group that is going to be used, e.g., the group for which a particular object 304(1) is a member. Then, the other object(s) 304 which together uniquely identify the object 304(1) within this group may be identified and the names for these objects 304 may be determined. Having obtained names for the objects 304, the name of the object 304(1) may be generated by combining the group name with the object names. In some implementations, the form of the name of the object 304(1) may be [<<class name>>: [object 1]; [object 2]; . . . ; [object n]].

Objects 304 may be related to one another via a relationship 306. Relationships 306 may be between physical objects 304, e.g., physical persons, places, or things that exist within the framework. Relationships 306 may also be between physical objects 304 and non-physical objects 304 such as concepts, attributes, and so forth. For example, "John is married to Sarah" is a natural language assertion describing a relationship 306 between two physical objects 304, in this case two people. As another example, "The apple is green" asserts a relationship 306 between the attribute object 304 "green" and a particular instance object 304 of an apple. As another example, "The book is about Albert Einstein's career" asserts a relationship 306 between a book and the concept of Albert Einstein's work history. As another example, "The soup tastes salty" asserts a relationship 306 between the attribute "salty" and the physical object 304 "soup." All of these natural language assertions also contain information about time (e.g., past, present, or future tense), which is discussed further below.

In some cases, a relationship 306 may also be considered an object 304. For example, [is married to] is an object 304 that corresponds to the concept of marriage between two people. As another example, [is an instance of] relates an instance object 304 to a class object 304, such as the relationship 306 between the instance Albert Einstein and the class human being. As another example, [applies to] relates an attribute object 304 to another object 304, indicating that a particular property or characteristic applies to the other object 304. In such cases, the other object 304 may be an instance, a class, a relation, another attribute, or any other type of object 304. As another example, [is a subclass of] relates one class to another and indicates that the first class is a more specific class than the second class, such that all objects 304 that are members of the first class are also members of the second class. For example, such a relationship 306 may apply between the class [apple] and the class [fruit], such that [apple] is a subclass of [fruit]. Accordingly, implementations may support a tree structure indicating a hierarchy of classes. Objects 304 may be members of each of the classes going up the tree structure with the root class being the class of all objects 304. A relationship 306 may be named using a present tense verb phrase that unambiguously describes the relationship 306.

In some implementations, NLP may be employed to extract statements 302 from the submitted work 104 and the published work(s) 110. A statement 302 may include three objects 304, in which one of the objects 304 may be the relationship 306 relating the other two objects 304. The syntax of a statement 302 may be:

[name (e.g., of the statement)]: [object 1] [object 2] [object 3]

The [name] object 304 may uniquely identify the statement 302 among the set of statements 302. In some implementations, the [name] may be omitted from the statement 302.

Object 1 and Object 3 may be of any type, and may include nouns or noun phrases such as characters, locations, things, entities, concepts, and so forth. Object 1 and Object 3 may also include adjectives or adjective phrases describing traits, states, characteristics, attributes, and so forth. Object 2 may be a relationship 306. In some cases, the statement 302 as a whole may be treated as an object 304, and may be related to other object(s) 304 via relationship(s) 306. In some implementations, the statement 302 may be stored and processed as a text string. In some cases, the statement 302 may be stored in a row of a table of a database (e.g., a relational database). In such cases, the three objects 304, Object 1, Object 2, and Object 3, may be stored in separate columns of the table.

The following are examples of statements 302:
[Harrison Walker] [is married to] [Roberta Walker].
[Tom Walker] [is an instance of] [human being].
[Tom Walker] [was born in] [Pretanzia].
[Pretanzia] [is the capital of] [the kingdom of Estrella].

A statement 302 may also be stored with information regarding its source, such as the position indicator 308 that describes a source position within a submitted work 104 or a published work 110. The statement 302 may also be stored with information regarding when the statement 302 was determined, which computing device or process extracted the statement 302, an individual who previously reviewed the statement 302, and so forth. By situating the relationship object 306 between the two other objects 304, implementations may provide for statements 302 that read similarly to natural language and that may be more readily understood by human readers.

In some implementations, a statement 302 may not include information regarding a time during which the statement 302 is valid, e.g., a time during which the statement 302 is a fact within its particular framework. For example, [Pretanzia] [is the capital of] [the kingdom of Estrella] asserts that the relationship [is the capital of] was, is, and will be true for at least one moment in the time line of the framework. It may be true for all of time, or it may be true for one or more moments or periods of time.

In some implementations, a statement 302(1) may be related to other statements 302(2) that describe time(s) during which the statement 302(1) is valid. For example, [fact.1]: [Pretanzia] [is the capital of] [the kingdom of Estrella] may be related to a statement 302(2) [fact.2]: [fact.1] [applies for timeperiod] [timeperiod: [timepoint: "1975"]; [iafter]], indicating that fact.1 is valid for times including the year 1975 and after within the framework. A statement 302(2) may also include both a start time and an end time for the validity of a statement 302(1). Some statements 302 may be valid for all time, and it may be possible to infer this from the relationship 306 included in the statement 302. In some cases, the determination of inconsistencies between the statements data 122 and the framework constraints data 120 may take into account the time(s) during which either or both of the compared statement 302 and the constraint 402 are valid. In some implementations, a framework may be modeled as a set of objects 304 and relationships 306 between pairs of the objects 304. As time within the framework changes (e.g., progresses), at least some of the relationships 306 may transition from invalid to valid or may transition from valid to invalid.

In some of the examples above, the statements 302 assert that a relationship 306 is true. A statement 302 may also assert that a relationship 306 is not true. In some implementations, a statement 302 may indicate a negation of a relationship 306 via the inclusion of one or more designated characters. For example, the statement 302 [fact.3]: [London] [is the capital of] [England] may be read as "London is not the capital of England," with the tilde (e.g., "") character indicating a negation of the relationship 306 "is the capital of".

In some implementations, contradictions or inconsistencies may be identified between pairs of statements 302, or between pairs of a statement 302 and a constraint 402. An inconsistency or contradiction may be identified in cases where a first statement 302(1) indicates that a relationship 306 is present between a pair of objects 304 at a moment in time within the framework, and a second statement 302(2) (or a constraint 402) indicates that the relationship 306 is not present between the same pair of objects 304 at the same moment in time.

An inconsistency or contradiction may also be identified in cases where a first statement 302(1) indicates that a first relationship 306(1) is present between a pair of objects 304 at a moment in time within the framework, and a second statement 302(2) (or a constraint 402) indicates that the same pair of objects 304 is associated via a second relationship 306(2) that differs from the first relationship 306(1). In some cases, an inconsistency may be identified in cases where the second relationship 306(2) is opposite to, non-overlapping with, or mutually exclusive with respect to the first relationship 306(1) at the same moment in time in the framework. For example, if a first object 304(1) and a second object 304(2) are related via a relationship 306(1) [is a parent of] in a statement 302, that statement 302 may be determined to be inconsistent with a constraint 402 stating that the first object 304(1) is related to the second object 304(2) via a relationship 306(2) [is a child of].

Figure 9:
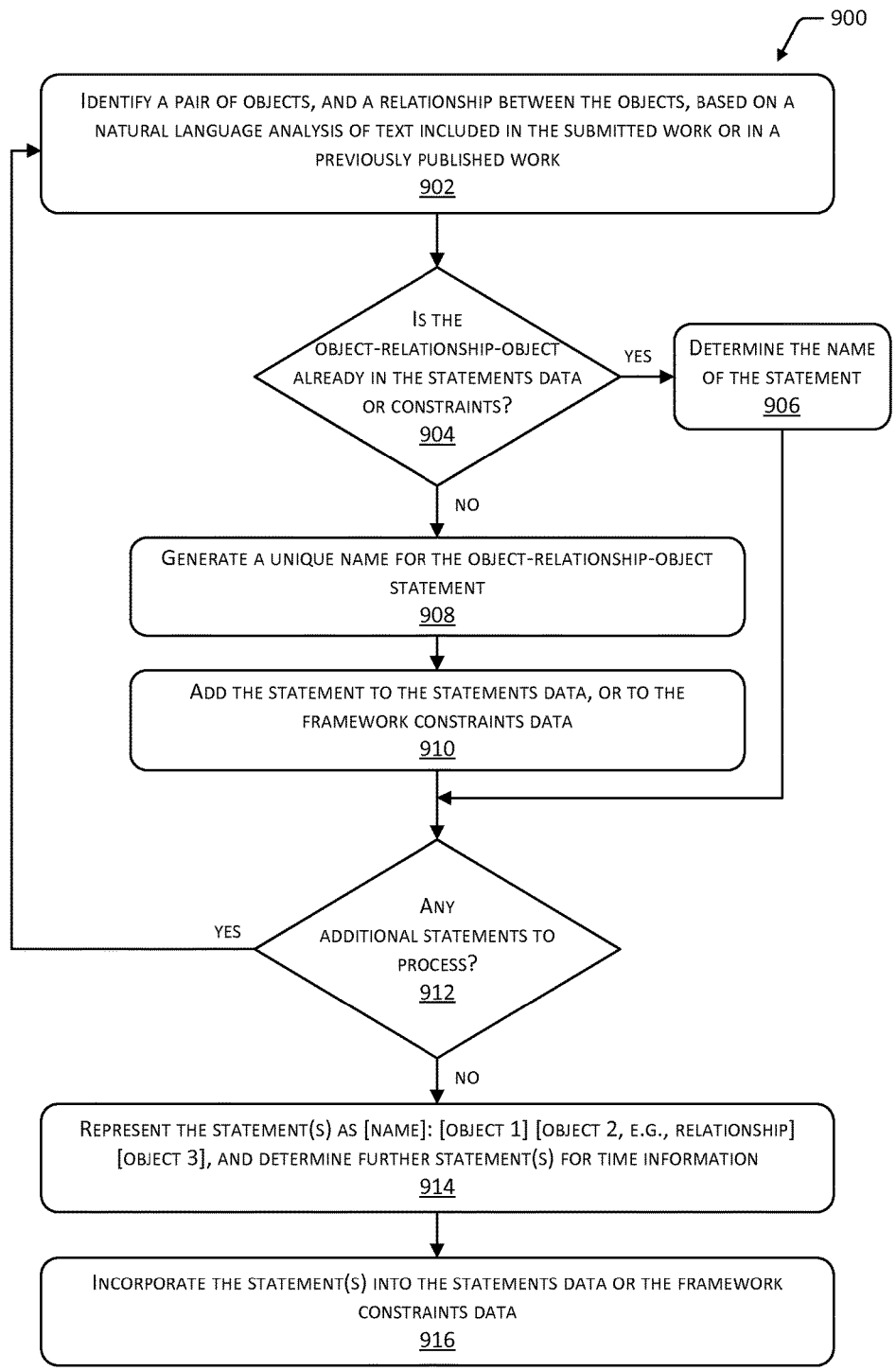
FIG. 9 depicts a flow diagram of a process for determining statements or constraints based on a natural language processing analysis of a submitted work or published work(s).

FIG. 9 depicts a flow diagram 900 of a process for determining statements 302 or constraints 402 based on the NLP analysis of the submitted work 104 or the published work(s) 110. One or more operations of the process may be performed by the statement determination module 112, the natural language analysis module 114, the inference module 116, or other modules executing on the analysis server device(s) 102 or elsewhere. The process of FIG. 9 may be employed to generate the statements data 122 based on an analysis of the submitted work 104. The process may be similarly employed to determine the framework constraints data 120 based on an analysis of the published work(s) 110 for a framework.

At 902, a pair of objects 304 is identified based on a NLP analysis of the text present in the submitted work 104 or in a published work 110. A relationship 306 between the objects 304 may also be determined.

At 904, a determination is made whether the pair of objects 304 and the relationship 306 comprises a statement 302 of the form object-relationship-object that is already present in either the statements data 122 or the framework constraints data 120. If so, the process may proceed to 906 and determine the name (e.g., the unique name) of that statement 302 as stored in the statements data 122 or the framework constraints data 120. The process may then proceed to 912. If the statement 302 is not already present in the statements data 122 or the framework constraints data 120, the process may proceed to 908.

At 908, a name (e.g., unique name) may be generated to identify the statement 302. At 910, the statement 302 may be added to the statements data 122 or the framework constraints data 120.

At 912, a determination is made whether there is additional text to analyze in the submitted work 104 or the published work(s) 110, and whether there are additional statement(s) 302 to be extracted from the submitted work 104 or the published work(s) 110. If so, the process may return to 902. If not, the process may proceed to 914.

At 914, the statement(s) 302 may be represented in the format as described above, e.g., [name]: [object 1] [object 2] [object 3], where "object 2" is a relationship 306 between the other two objects 304.

At 916, the statement(s) 302 may be incorporated into the statements data 122 or the framework constraints data 120.

In some implementations, the statement(s) 302 in the statements data 122 or the constraint(s) 402 in the framework constraints data 120 may be supplemented by inferring additional statements 302. Such inferences may be based on facts present in the knowledge base 118(2). The facts present in the knowledge base 118(2) may be independent of any particular framework. For example, a framework may be a literary framework comprising a fictional world associated with the knowledge base 118(1), and the knowledge base 118(2) may include facts that are valid in the real, non-fictional world.

Implementations may employ the inference module 116 to generate additional statements 302 based on inference from the statements 302 extracted from the submitted work 104 or the published work(s) 110. In some implementations, the inference module 116 may employ one or more generators to generate additional statement(s) 302 based on inference(s). A generator may be specified in three parts. The first part may be a title line identifying the generator and listing variables. The second part may be a header query that is to be executed to determine whether the generator applies and, in some cases, to generate values such as the list of variables after the generator line. The third part may be a footer describing a number of statements that may potentially be generated by the generator. A first example of a generator is listed in Example Code 1 below.

Example Code 1 generator a %,b %,tp
f: a % [is married to] b %
f [applies for timeperiod] tp
=>
t: b % [is married to] a % *
t [applies for timeperiod] tp In this example, the generator asserts that if person "a" is married to person "b" for a given time period then person "b" is also married to person "a" for that same time period. Such an inference may be valid for a marriage relationship 306 but may not be valid for other types of relationships 306, such as the relationship 306 [is a parent of]. In some implementations, such an inference may be performed based on determining that the relationship 306 includes an attribute "symmetric" and inferring the additional statement 302 by switching the two objects 304 in such cases.

In this way, generators may perform inferences based on a manner in which the existence of a first relationship 306 implies the existence of other relationships 306 or based on a manner in which the existence of an attribute may be used to infer other statements 302.

Example Code 2 provides another example of a generator that may be employed in making inferences based on time.

Example Code 2 generator tr
a$ [applies for timeperiod] tr
=>timeperiod_to_timepoint@local
a$ [applies at timepoint] tp$ *

This generator may indicate that a relationship 306 is valid at a timepoint if the timepoint lies within a time period when the relationship 306 is valid. This generator may enable efficiencies given that it may not be practical to list every instant at which a relationship 306 is valid. Instead, implementations may store a period of time for a relationship 306 and the comparison of statement(s) 302 to constraint(s) 402 may be according to the time period.

In some implementations, the dollar character at the end of the tp$ variable may indicate that the variable is to be matched with a named object 304 that is a named timepoint. Given that there may be an infinite number of timepoints in any time period, it may be possible to check particular timepoint(s) but not all of them. Implementations may employ other types of generators to perform inference operations.

Figure 10:
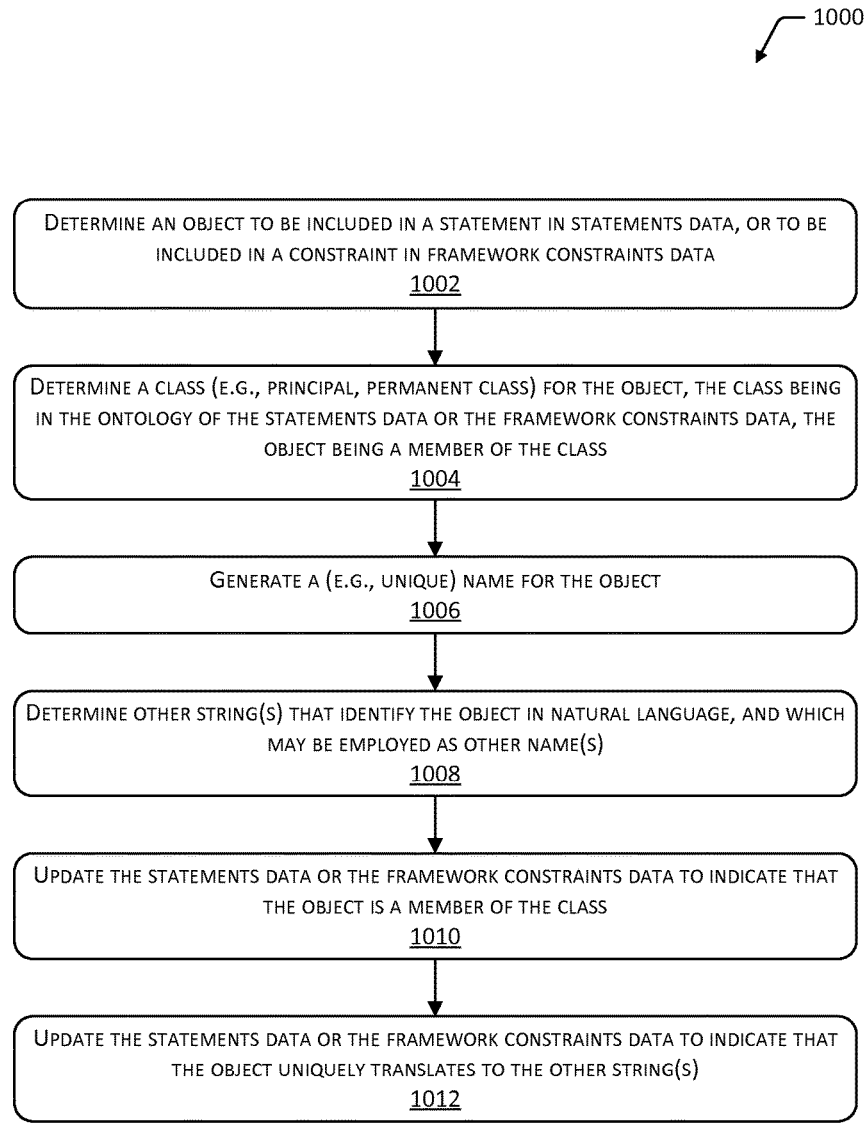
FIG. 10 depicts a flow diagram of a process for adding statement(s) to the statements data or for adding constraint(s) to the framework constraints data.

FIG. 10 depicts a flow diagram 1000 of a process for adding statement(s) 302 into the statements data 122 or for adding constraint(s) 402 into the framework constraints data 120. One or more operations of the process may be performed by the statement determination module 112, the natural language analysis module 114, the inference module 116, or other modules executing on the analysis server device(s) 102 or elsewhere.

At 1002, an object 304 may be determined to be added to the statements data 122 in a statement 302, or added to the framework constraints data 120 in a constraint 402.

At 1004, in some implementations a class may be determined that includes the object 304. The class may be a principal or permanent class for the object 304. In some cases, the class may be in the ontology of the statements data 122 or the framework constraints data 120. For example, if the object 304 is a human character that is described in a work, the class may be [human being].

At 1006, a name (e.g., a unique name) may be generated for the object 304. In some implementations the name may be a noun or a noun phrase, in English or another language, which uniquely identifies the object 304. In some cases, the name may be a parameterized name as described above.

At 1008, one or more other strings may be determined that (e.g., uniquely) identify the object 304 in a natural language. Such strings may be employed as other names for the object 304. The other strings may be of varying lengths, and may include descriptive clauses. For example, an object 304 for a character named "Percival Short" may have other strings that are employable as names for the object 304, such as "Percy Short", "Percival Xavier Short", "Percival X. Short", "Minister Short", "Percival Short, Minister of Whimsical Affairs for the Government of Estrella", and so forth. In some cases, the name determined at 1006 may uniquely identify the object 304, and may be associated with all the other string(s) that provide alternative name(s), description(s), or identifier(s) of the object 304.

At 1010, the statements data 122 or the framework constraints data 120 may be updated to include statement(s) 302 or constraint(s) 402 indicating that the object 304 is a member of the class, in cases where the membership in the class is not inferable based on the name. For example, a statement 302 or a constraint 402 may be added indicating that [Percival Short] [is an instance of] [human being].

At 1012, the statements data 122 or the framework constraints data 120 may be updated to include statement(s) 302 or constraint(s) 402 indicating translation relationship(s) 306 between the name determined at 1006 and each of the string(s) determined at 1008. For example, a statement 302 or a constraint 402 may be added indicating that [Percival Short] [translates as] [Percy Short], [Percival Short] [translates as] [Percival Xavier Short], and so forth.

Some implementations provide for an attribute object 304, which is semantically a property of one or more other objects 304, or a property of a relationship 306. The attribute object 304 may be related to other objects 304, or to a relationship 306, using the [applies to] relationship 306. An attribute object 304 may be employed by the inference module 116 in making inferences. For example, if a relationship 306 is symmetric then a statement 302(2) may be generated by switching the order of the objects 304 in the statement 302(1). Attribute objects 304 may include, but are not limited to, the following:

A transitive attribute [transitive], indicating that that if "a" relates to "b" and "b" relates to "c" then "a" relates to "c" for the time period(s) that both overlap. The relationship 306 [is geographically located within] is a transitive relationship. For example, Boston being in Massachusetts and Massachusetts being in the United States enables an inference that Boston is in the United States.

A left unique attribute [left unique], indicating that if "a" is related to "b" and "c" is not "a" then "c" is not related to "b" for the time period(s) that "a" is related to "b". The relationships 306 [is married to] and [is the capital of] are examples of left unique relationships 306. In a natural language, expressing a relationship 306 using the definite article (e.g., "the" in English) may indicate this type of relationship 306, such as "is the husband of" or "is the child of". Use of the indefinite article (e.g., "a" in English) may indicate a relationship 306 that is not left unique, such as "is a child of" or "is a parent of".

A right unique attribute [right unique], may be similar to a left unique attribute, with the difference being that a right unique attribute may indicate that the object 304(2) (e.g., the right-listed object 304 in the statement 302) is the unique object 304. A relationship 306 that is both [right unique] and [symmetric] is also [left unique]. Some relationships 306 may be [left unique] but not [right unique] and vice versa. For example, [is the genetic father of] is [left unique] but not [right unique], because it is possible to father more than one child but it is not possible for a child to have more than one genetic father, at least in frameworks in which biology is similar to that of the real world.

A permanent relation attribute [permanent relation] may indicate that if the relationship 306 is true at any moment then the relationship 306 is true at all moments. Accordingly, the implementations may ignore the time modifying statement(s) 302 that modify statement(s) 302 which include the [permanent relation] attribute. In some cases, the relationship 306 [is an instance of] may not include the [permanent relation] attribute given that it is possible for objects 304 to cease being members of some classes. For example, the statement 302 [John Smith] [is an instance of] [police officer] may not include the [permanent relation] attribute given that the police officer status may be valid for a portion of the life of the character John Smith. The relationship 306 [is an instance of] may include the [permanent relation] attribute in cases where the statement 302 is describing an object 304 as a member of a class. For example, [permanent membership] [applies to] [human being] means that if [Tom Walker] [is an instance of] [human being] at any point then this relationship 306 may be valid for all times.

Each object 304 may be a member of at least one permanent class. In some cases, a successor object 304(2) may be employed to replace another object 304(1) when the object 304(1) is changed in such a fundamental way that it may no longer be considered a member of its main permanent class. Accordingly, implementations may generate a new object 304(2) with a new name that has replaced the object 304(1). For example, if the character "Percival Short" is killed in a work then Percival Short may no longer be an instance of a human being, and [Percival Short] [is an instance of] [human being] may no longer be a valid statement 302. Accordingly, a new object 304(2) [the remains of Percival Shortbus] may be generated, distinct from the object 304(1) [Percival Short]. In such cases, there may be a relationship 306 linking the living character's object 304(1) and the deceased character's object 304(2). Statement(s) 302 may be generated to describe the time periods during which each object 304 is present in the framework, and how the time of death relates the two objects 304.

Figure 11:
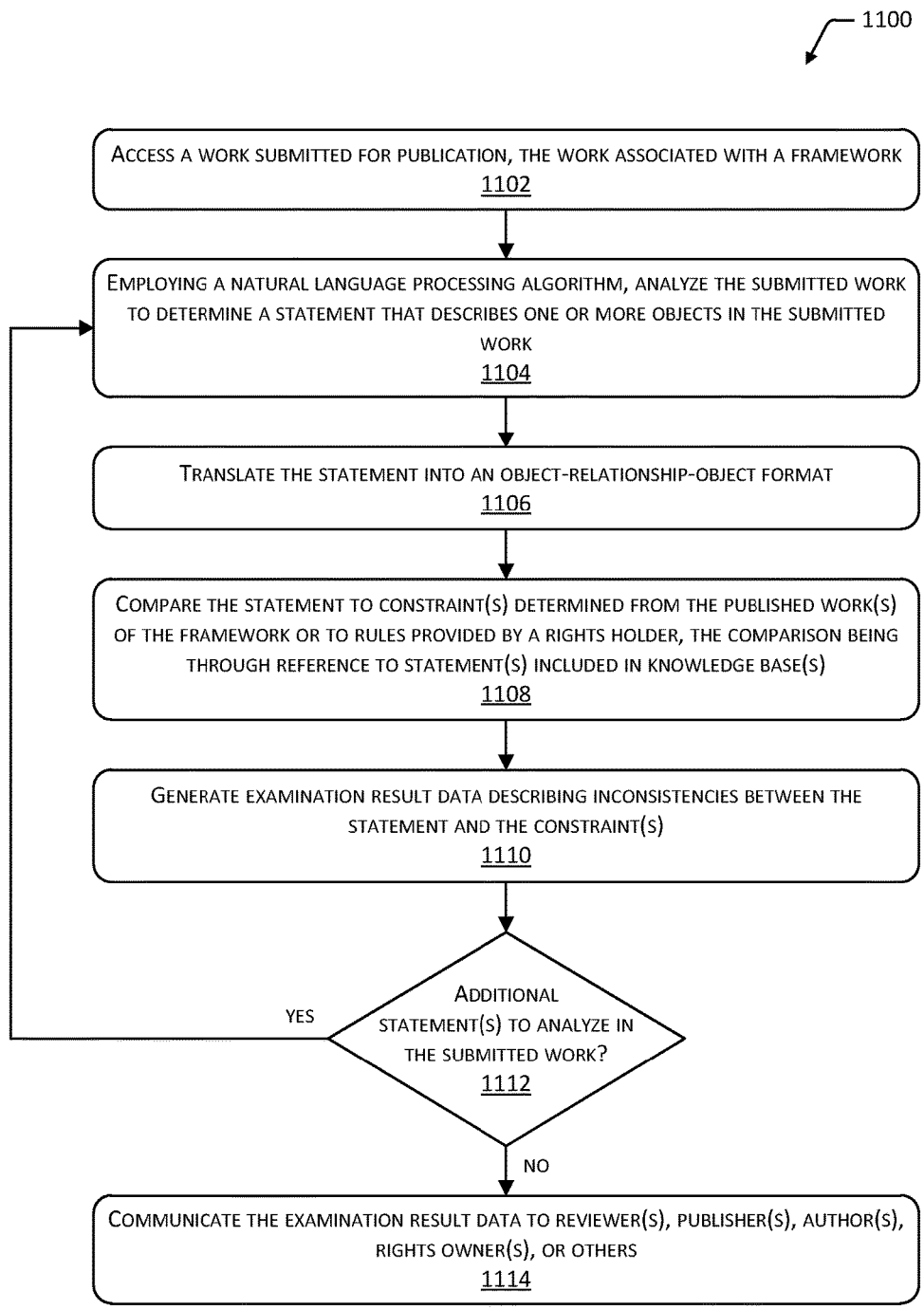
FIG. 11 depicts a flow diagram of a process for analyzing a submitted work via natural language based analysis.

FIG. 11 depicts a flow diagram 1100 of a process for analyzing the submitted work 104 via natural language based analysis, to identify inconsistencies between the submitted work 104 and the published work(s) 110 of a framework. One or more operations of the process may be performed by the statement determination module 112, the natural language analysis module 114, the inference module 116, or other modules executing on the analysis server device(s) 102 or elsewhere. At least a portion of the process may be performed as described in U.S. patent application Ser. No. 13/106,562, titled "Extracting Structured Knowledge From Unstructured Text," which was filed on May 12, 2011 and which is incorporated by reference above. In implementations depicted by FIG. 11, the inference operations may be performed as part of the operations to analyze the submitted work 104 instead of the inference operations being performed prior to the analysis of the submitted work 104 as depicted in FIGS. 6-8.

At 1102, the submitted work 104 is accessed as described above with reference to 702. At 1104, the submitted work 104 is analyzed to determine a statement 302 that describes one or more objects 304 in the submitted work 104, as described above with reference to 704. In some cases, at 1106 the statement 302 may be translated into an object-relationship-object format as described with reference to FIGS. 3 and 9.

At 1108, the statement 302 may be compared to the constraint(s) 402 present in the framework constraints data 120 determined based on the published work(s) 110 of the framework. Such a comparison may identify any inconsistencies between the statement 302 and the constraint(s) 402 as described above. In some cases, the comparison at 1108 may include comparing the statement 302 to the constraint(s) 402 through reference to other statement(s) 302 included in the knowledge base 118(1) or fact(s) included in the knowledge base 118(2). Such reference may include inference based on statement(s) 302 or fact(s) as described above. The comparison(s) at 1108 may also be performed between the statement 302 and one or more rules included in the framework rules data 126.

For example, a statement 302 "Tom Walker was born in Canada" may be determined based on an analysis of the submitted work 104. A constraint 402 "Tom Walker was born in Dublin" may be determined based on an analysis of the published work(s) 110 for a framework. An inconsistency between the statement 302 and the constraint 402 may be determined via inferences to facts included in the knowledge base 118(2). Such facts may include "Dublin is in Ireland", "Canada is geographically separate from Ireland", and "a person may only have one birthplace."

At 1110, the examination result data 128 may be generated to describe any inconsistencies determined at 1108. The examination result data 128 may be arranged as described above with reference to FIGS. 5 and 8.

At 1112, a determination is made whether there are additional statements 302 to be analyzed. If so, the process may return to 1104 and analyze another statement 302. If there are no further statements 302 to be analyzed, the process may proceed to 1114. At 1114, the examination result data 128 may be communicated to reviewer(s), publisher(s), author(s), rights owner(s), or other interested parties as described above with reference to FIG. 8. In some implementations, the identification of inconsistencies may indicate that the publication of the submitted work 104 may not proceed until the inconsistencies have been reviewed or resolved.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and may be encoded in one or more computer-readable storage media as instructions executable on one or more processors.

Embodiments may be provided as one or more computer program products that include one or more non-transitory computer readable storage media having stored thereon instructions (in compressed or uncompressed form) that may be used to program a computer (or other electronic device) to perform processes or methods described herein. The one or more computer readable storage media may include, but are not limited to, one or more of an electronic storage medium, a magnetic storage medium, an optical storage medium, a quantum storage medium, or a mechanical data storage medium. For example, the one or more computer readable storage media may include, but are not limited to, hard drives, floppy diskettes, optical disks, read only memories (ROMs), random access memories (RAMs), erasable programmable ROMs (EPROMs), electrically EPROMs (EEPROMs), flash memory, magnetic cards, optical cards, solid-state memory devices, or other types of physical media suitable for storing electronic instructions. Further, embodiments may also be provided as one or more computer program products including one or more transitory machine-readable signals in a compressed or an uncompressed form. Such machine-readable signals may or may not be modulated using a carrier. Examples of the machine-readable signals include, but are not limited to, signals that a computing system or other machine hosting or running a computer program may be configured to access. Machine-readable signals may include signals transmitted over one or more networks. For example, a transitory machine-readable signal may comprise transmission of software over a network such as the Internet. Separate instances of the programs may be executed on or distributed across separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
at least one memory storing computer-executable instructions; and
at least one processor in communication with the at least one memory, the at least one processor configured to access the at least one memory and execute the computer-executable instructions to:
access a work submitted for publication, the work includes a framework identifier indicating a framework that is characterized by a plurality of objects, the plurality of objects comprising a first object;
perform a semantic analysis of the work to determine a first statement that describes the first object in the work, the first statement describing a relationship between the first object and a second object;
access constraint data that includes one or more constraints governing usage of the first object in works associated with the framework;
access knowledge based constraint data that includes one or more knowledge constraints generated based on the constraint data, wherein the one or more knowledge constraints govern the usage of the first object in the works associated with the framework;
compare the first statement to the one or more constraints and the one or more knowledge constraints;
based on the comparison, identify one or more inconsistencies between the first statement, the one or more constraints, and the one or more knowledge constraints;
determine one or more locations of the one or more identified inconsistencies;
determine non-publication of the work in response to the identified inconsistency; and
generate examination result data that indicates the one or more identified inconsistencies and the one or more locations.

2. The system of claim 1, wherein the at least one processor is further configured to access the at least one memory and execute the computer-executable instructions to:
compare the first statement and the one or more constraints with reference to a second statement comprising information that is determined independently of the framework; and
wherein the identifying the one or more inconsistencies between the first statement and the one or more constraints is further based on the comparison of the first statement and the one or more constraints with reference to the second statement.

3. The system of claim 1, wherein the work comprises a manuscript submitted for publication as an electronic book.

4. The system of claim 1, wherein:
the work comprises one or more of audio content, video content, or game content; and
the determining the first statement further comprises performing the semantic analysis on a transcript of at least a portion of the work.

5. The system of claim 1, wherein the at least one processor is further configured to access the at least one memory and execute the computer-executable instructions to:
access at least one published work associated with the framework;
perform the semantic analysis of the at least one published work to determine a plurality of statements that describe the plurality of objects in the at least one published work;
incorporate the plurality of statements into the knowledge based constraint data;
designate one of the plurality of statements in the knowledge based constraint data as a constraint; and
store the constraint.

6. The system of claim 1, wherein the one or more constraints is a rule specified by one or more of an author, a publisher, or a rights holder associated with at least one published work of the framework.

7. The system of claim 1, wherein:
the first object comprises one or more of a first noun or a first noun phrase; and
the second object comprises one or more of a second noun or a second noun phrase.

8. The system of claim 1, wherein:
the first object comprises one or more of a noun or a noun phrase; and
the second object comprises one or more of an adjective or an adjective phrase.

9. The system of claim 1, wherein:
the one or more knowledge constraints indicates that the second object is an instance of a class identified by a third object; and
the identifying the one or more inconsistencies further includes modifying the first statement to replace the second object with the third object.

10. One or more non-transitory computer-readable media storing instructions which, when executed by at least one processor, instruct the at least one processor to perform actions comprising:
accessing a work associated with a framework created using other works, the framework being characterized by a plurality of objects described in the other works, the plurality of objects comprising a first object;
performing a semantic analysis of the work to determine a first statement that describes the first object in the work, the first statement describing a relationship between the first object and a second object;
accessing a first constraint governing usage of the first object in works associated with the framework;
accessing a second constraint that is generated based on the first constraint, wherein the second constraint governs the usage of the first object in the works that are associated with the framework;
comparing the first statement to the first constraint to identify one or more inconsistencies between the first statement and the first constraint;
comparing the first statement to the second constraint to identify one or more inconsistencies between the first statement and the second constraint;
determining one or more locations of the one or more inconsistencies in the work; and
storing examination result data that indicates the one or more inconsistencies and the one or more locations.

11. The one or more computer-readable media of claim 10, wherein:
the work comprises a manuscript submitted for publication as an electronic book;
the other works comprise one or more of a book, a game, a song, a television episode, or a film; and
the framework comprises a fictional world described in the other works.

12. The one or more computer-readable media of claim 10, the actions further comprising:
  comparing the first statement and the first constraint and the second constraint with reference to a second statement comprising information that is determined independently of the framework; and
  wherein the identifying the one or more inconsistencies is further based on the comparing of the first statement and the first constraint with reference to the second statement.

13. The one or more computer-readable media of claim 10, wherein:
  the second constraint indicates that the second object is an instance of a class identified by a third object; and
  the identifying the one or more inconsistencies further includes modifying the first statement to replace the second object with the third object.

14. The one or more computer-readable media of claim 10, wherein:
  the first statement describes a first relationship between the first object and the second object;
  the first constraint describes a second relationship between the first object and the second object; and
  the identifying the one or more inconsistencies comprises determining that the first relationship and the second relationship are mutually exclusive.

15. The one or more computer-readable media of claim 10, the actions further comprising:
  accessing the other works associated with the framework;
  performing a semantic analysis of the other works to determine a plurality of statements that describe the plurality of objects in the other works;
  incorporating the plurality of statements into knowledge based constraint data, wherein the knowledge based constraint data includes the second constraint;
  designating one of the plurality of statements in the knowledge based constraint data as a constraint; and
  storing the constraint.

16. The one or more computer-readable media of claim 10, wherein the constraint is a rule specified by one or more of an author, a publisher, or a rights holder associated with at least one of the other works of the framework.

17. A computer-implemented method storing instructions which, when executed by at least one processor, instruct the at least one processor to perform actions comprising:
  accessing a work submitted for publication, the work associated with a framework that is characterized by a plurality of objects including a first object;
  performing a semantic analysis of the work to determine a first statement that describes the first object in the work, the first statement describing a relationship between the first object and a second object;
  accessing a first constraint governing usage of the first object in works associated with the framework;
  accessing second constraint data that includes one or more second constraints generated based on constraint data, wherein the one or more second constraints govern the usage of the first object in the works that are associated with the framework;
  comparing the first statement to the first constraint to identify one or more inconsistencies between the first statement and the first constraint;
  comparing the first statement to the one or more second constraints;
  determining one or more locations of the one or more identified inconsistencies in the work; and
  storing examination result data that indicates the one or more inconsistencies and the one or more locations of the one or more identified inconsistencies.

18. The method of claim 17, wherein the at least one processor further executes computer-executable instructions comprising:
  accessing other works associated with the framework;
  performing a semantic analysis of the other works to determine a plurality of statements that describe the plurality of objects in the other works;
  incorporating the plurality of statements into the second constraint data;
  designating one of the plurality of statements in the second constraint data as a constraint; and
  storing the constraint.

19. The method of claim 17, wherein the identifying the one or more inconsistencies further includes comparing the one or more second constraints and the first constraint with reference to a second statement that comprises non-fictional information that is determined independently of the framework.

20. The method of claim 17, wherein:
  the first object comprises one or more of a noun or a noun phrase; and
  the second object comprises one or more of:
    an adjective,
    an adjective phrase,
    a second noun, or
    a second noun phrase.

* * * * *